(12) United States Patent
Oh et al.

(10) Patent No.: US 9,131,264 B2
(45) Date of Patent: Sep. 8, 2015

(54) METHOD AND APPARATUS FOR PROCESSING DIGITAL SERVICE SIGNALS

(71) Applicant: LG Electronics Inc., Seoul (KR)

(72) Inventors: Sejin Oh, Seoul (KR); Jinpil Kim, Seoul (KR); Seungjoo An, Seoul (KR); Kyungho Kim, Seoul (KR); Kyoungsoo Moon, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 13/943,283

(22) Filed: Jul. 16, 2013

(65) Prior Publication Data

US 2014/0047475 A1 Feb. 13, 2014

Related U.S. Application Data

(60) Provisional application No. 61/671,807, filed on Jul. 16, 2012.

(51) Int. Cl.
| | |
|---|---|
| *H04N 5/445* | (2011.01) |
| *H04N 21/435* | (2011.01) |
| *H04N 21/235* | (2011.01) |
| *H04N 21/44* | (2011.01) |
| *H04N 21/462* | (2011.01) |
| *H04N 21/61* | (2011.01) |
| *H04N 21/8352* | (2011.01) |
| *H04N 21/8358* | (2011.01) |
| *H04N 21/858* | (2011.01) |

(52) U.S. Cl.
CPC ....... *H04N 21/4355* (2013.01); *H04N 21/2355* (2013.01); *H04N 21/44008* (2013.01); *H04N 21/4622* (2013.01); *H04N 21/6125* (2013.01); *H04N 21/8352* (2013.01); *H04N 21/8358* (2013.01); *H04N 21/8586* (2013.01)

(58) Field of Classification Search
USPC ................ 725/30, 32, 35, 39, 45, 46, 93, 112
See application file for complete search history.

(56) References Cited

U.S. PATENT DOCUMENTS 6,421,070 B1 * 7/2002 Ramos et al. ................. 715/763
2005/0166231 A1 7/2005 Terakado et al.
(Continued)

FOREIGN PATENT DOCUMENTS

WO 2011-039763 4/2011

*Primary Examiner* — Jivka Rabovianski
(74) *Attorney, Agent, or Firm* — Dentons US LLP

(57) ABSTRACT

An apparatus of processing a digital service signals and a method thereof are disclosed. The present invention includes a receiving module configured to receive the digital service signals having contents and receive URL information for additional data related to the contents, an extracting module configured to extract logo data for indicating contents provider from each of the video frames of the contents, wherein the logo data is located in a specific area in the each of the video frames, a comparing module configured to compare the extracted logo data with stored logo data to obtain channel information of the contents, an obtaining module configured to obtain the channel information of the contents from metadata related to the logo data and obtain the additional data related to the contents and a generating module configured to generate a request for obtaining the URL information using the obtained channel information, wherein the receiving module receives the URL information using the generated request, wherein the obtaining module obtains the additional data over an IP (Internet Protocol network) according to the URL information.

8 Claims, 34 Drawing Sheets

(56) References Cited

U.S. PATENT DOCUMENTS

| | | |
|---|---|---|
| 2008/0271091 A1 | 10/2008 | White |
| 2010/0226530 A1 | 9/2010 | Lev |
| 2012/0066718 A1 | 3/2012 | Pack et al. |
| 2013/0086466 A1* | 4/2013 | Levy et al. .................... 715/234 |

* cited by examiner

FIG. 11

| Syntax | No. of bits | format |
|---|---|---|
| ATSC_content_identifier() { | | |
|     TSID | 16 | uimsbf |
|     reserved | 2 | bslbf |
|     end_of_day | 5 | uimsbf |
|     unique_for | 9 | uimsbf |
|     content_id | var | |
| } | | |

FIG. 19
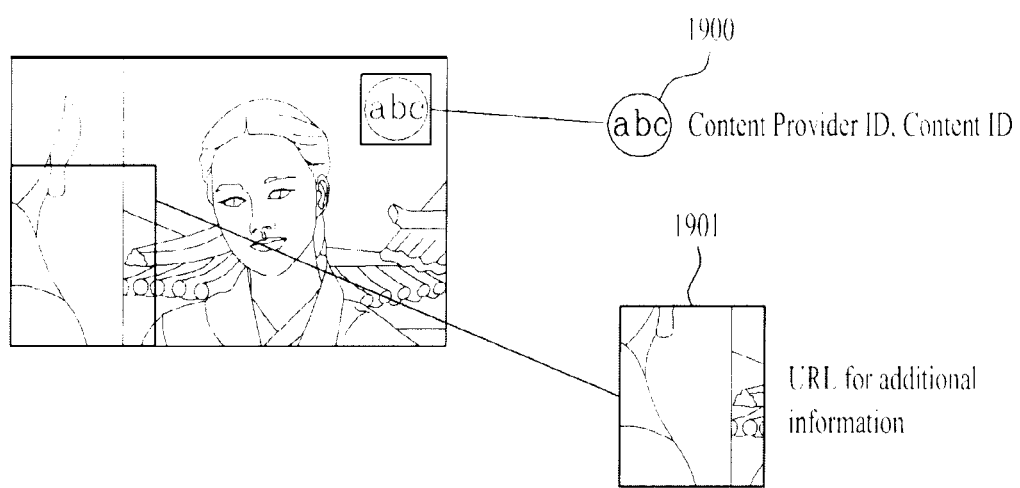
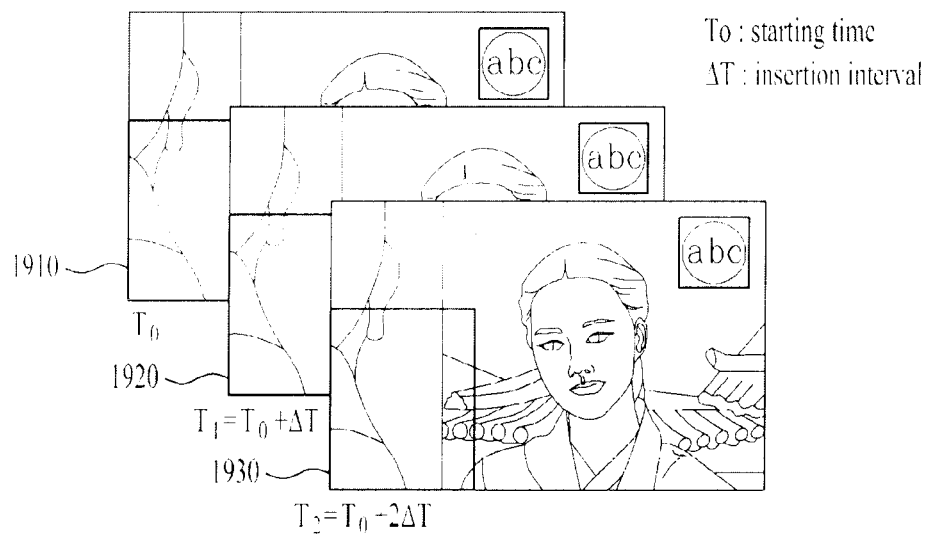

FIG. 25
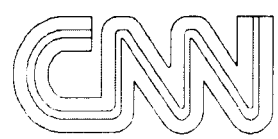 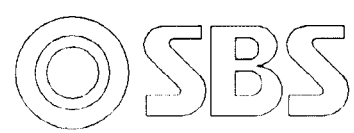 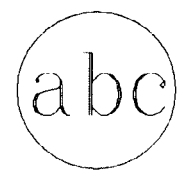
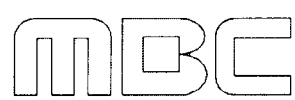  
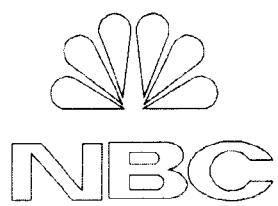  

METHOD AND APPARATUS FOR PROCESSING DIGITAL SERVICE SIGNALS

This application claims the benefit of U.S. Provisional Application No. 61/671,807, filed on Jul. 16, 2012, which is hereby incorporated by reference as if fully set forth herein.

BACKGROUND OF THE INVENTION

1. Field of the Invention

The present invention relates to a method and apparatus for processing an automatic content recognition (ACR) service related to a broadcast program, and more particularly, to a method and apparatus for providing an additional service related to broadcast content in an ACR environment.

2. Discussion of the Related Art

As digital satellite broadcasting has been introduced, digital data broadcasting has appeared as a new supplementary service. An interactive data broadcast, which is a representative interactive service, may transmit not only a data signal but also an existing broadcast signal to a subscriber so as to provide various supplementary services.

A digital data broadcast may be largely divided into an independent service using a virtual channel and a broadcast-associated service via an enhanced TV (ETV). The independent service includes only text and graphics without a broadcast image signal and is provided in a format similar to an existing Internet web page. Representative examples of the independent service include a weather and stock information provision service, a TV banking service, a commercial transaction service, etc. The broadcast-associated service transmits not only a broadcast image signal but also additional text and graphic information. A viewer may obtain information regarding a viewed broadcast program via a broadcast-associated service. For example, there is a service for enabling a viewer to view a previous story or a filming location while viewing a drama.

In a broadcast-associated service of a digital data broadcast, an ETV service may be provided based on ACR technology. ACR means technology for automatically recognizing content via information hidden in the content when a device plays audio/video (A/V content) back.

In implementation of ACR technology, a watermarking or fingerprinting scheme may be used to acquire information regarding content. Watermarking refers to technology for inserting information indicating a digital content provider into digital content. Fingerprinting is equal to watermarking in that specific information is inserted into digital content and is different therefrom in that information regarding a content purchaser is inserted instead of information regarding a content provider.

However, a conventional system for providing an interactive service via an ACR function has several restrictions.

If a content provider (or a broadcaster) transmits content for a real-time service and enhancement data (or additional data) for an ETV service and a TV receiver receives the content for the real-time service and the enhancement data through external input, the content for the real-time service may be received but the enhancement data may not be received.

In addition, if an existing ETV service is provided on an ACR system, intervention of a separate ACR server (or an ACR solution provider) is inevitably required. Therefore, there is a need for a receiver for performing an ACR function alone without a separate ACR server.

In addition, in watermarking technology for providing an ETV service, if the amount of information included in a watermark is large, quality of content in which a watermark is embedded may be deteriorated. Therefore, there is a limitation in efficient use of watermarking.

In addition, in fingerprinting technology for providing an ETV service, an external ACR server for recognizing content is additionally necessary and a content recognition result depends on the size of a reference set.

SUMMARY OF THE INVENTION

Accordingly, the present invention is directed to a method and apparatus for processing digital service signals that substantially obviates one or more problems due to limitations and disadvantages of the related art.

An object of the present invention is to identify information regarding a broadcast program using a broadcast system and provide additional information of the identified broadcast program in real time.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method of processing digital service signals according to the present invention includes receiving the digital service signals having contents, extracting logo data for indicating contents provider from each of the video frames of the contents, wherein the logo data is located in a specific area in the each of the video frames, comparing the extracted logo data with stored logo data to obtain channel information of the contents, obtaining the channel information of the contents from metadata related to the logo data, generating a request for obtaining URL information for the additional data related to the contents using the obtained channel information, receiving the URL information using the generated request and obtaining the additional data over an IP (Internet Protocol) network according to the URL information.

Preferably, the method further includes extracting watermarks from the audio frames of the contents, wherein the watermarks carry program information related to the contents, wherein the program information includes content id information identifying each of the contents and obtaining the program information in the watermarks.

Preferably, the generating further uses the obtained program information to generate the request.

Preferably, when the video frames include symbol data for indicating a program related to the contents, the method further comprises extracting the symbol data from the each of the video frames of the contents, wherein the symbol data is located in a specific area in the each of the video frames, processing the extracted symbol data to obtain program information related to the contents, wherein the program information includes content id information identifying each of the contents and obtaining the program information.

Preferably, the generating further uses the obtained program information to generate the request.

Preferably, the method further includes updating the metadata related to the logo data periodically.

Preferably, the method further comprises extracting watermarks from the specific area of the video frames, wherein the watermarks carry the channel information and program information related to the contents, wherein the program information includes content id information identifying each of the contents.

In another aspect of the present invention, a method of processing digital service signals, the method comprising generating the digital service signals having contents, inserting logo data for indicating contents provider into each of the video frames of the contents, wherein the logo data is located in a specific area in the each of the video frames and transmitting the digital service signals, wherein the logo data is for obtaining channel information of the contents, and the channel information is for receiving the URL information for additional data related to the contents.

Preferably, the contents include audio frames, the method further comprises generating watermarks and inserting the generated watermarks into the audio frames of the contents, wherein the watermarks carry program information related to the contents, wherein the program information includes content id information identifying each of the contents.

Preferably, the method further comprises generating watermarks and inserting the generated watermarks into the video frames of the contents, wherein the watermarks carry channel information and program information related to the contents, wherein the program information includes content id information identifying each of the contents.

Preferably, the method further includes dividing the audio or video frames into sub-frames, detecting specific sub-frames from among the divided sub-frames to insert the watermarks, inserting the watermarks into the detected specific sub-frames and assembling the divided sub-frames into the audio or video frames.

Preferably, the method further comprises generating symbol data for indicating a program related to the contents and inserting the generated symbol data into the each of the video frames of the contents, wherein the inserted symbol data is located in a specific area in the each of the video frames.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 11 is a diagram showing the structure of a content identifier (ID) according to an embodiment of the present invention;

FIG. 19 is a diagram showing a method of embedding a profiled watermark according to an embodiment of the present invention;

FIG. 25 is a diagram showing a broadcaster logo according to an embodiment of the present invention;

DETAILED DESCRIPTION OF THE INVENTION

Figure 1:
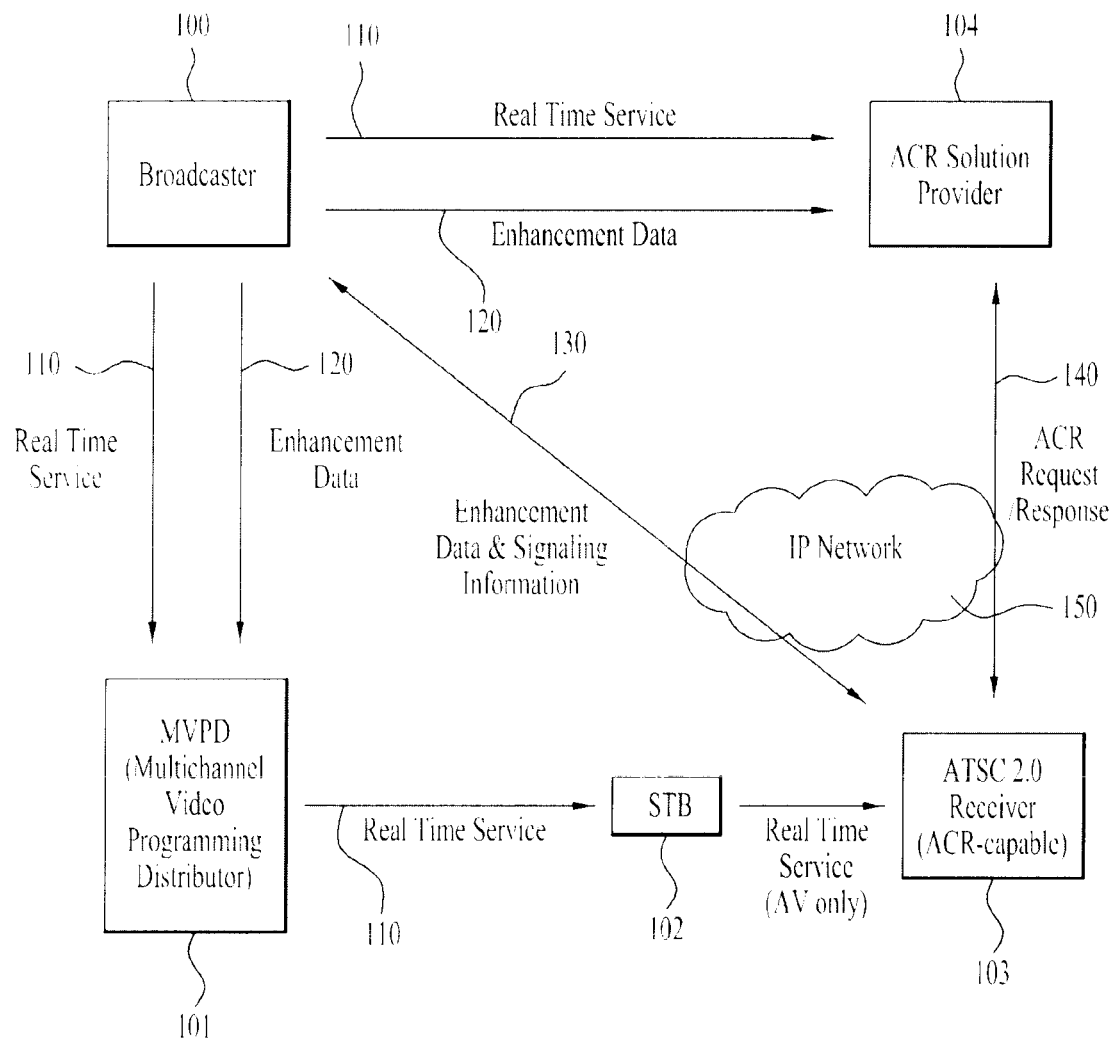
FIG. 1 is a diagram showing an ACR based ETV service system.

Reference will now be made in detail to the preferred embodiments of the present invention, examples of which are illustrated in the accompanying drawings. Wherever possible, the same reference numbers will be used throughout the drawings to refer to the same or like parts.

Reference will now be made in detail to the preferred embodiments of the present invention, examples of which are illustrated in the accompanying drawings.

Reference will now be made in detail to the preferred embodiments of the present invention, examples of which are illustrated in the accompanying drawings. The configuration and operation of the embodiments of the present invention will be described with reference to the accompanying drawings. The configuration and operation of the present invention shown in the drawings and described hereinafter will be described in at least one embodiment, without limiting the spirit and scope of the present invention.

Although the terms used in the present invention are selected from generally known and used terms, terms used herein may be changed depending on operator's intention or customs in the art, appearance of a new technology, or the like. In addition, some of the terms mentioned in the description of the present invention have been selected by the applicant at his or her discretion, the detailed meanings of which are described in relevant parts of the description herein. Furthermore, it is required that the present invention is understood, not simply by the actual terms used but by the meanings of each term lying within.

FIG. 1 is a diagram showing an ACR based ETV service system.

The ACR based ETV service system shown in FIG. 1 may include a broadcaster or content provider 100, a multichannel video programming distributor (MVPD) 101, a set-top box (STB) 102, a receiver 103 such as a digital TV receiver, and an ACR server (or an ACR Solution Provider) 104. The receiver 103 may operate according to definition of the advanced television system committee (ATSC) and may support an ACR function. A real-time broadcast service 110 may include A/V content.

A digital broadcast service may be largely divided into a terrestrial broadcast service provided by the broadcaster 100 and a multi-channel broadcast service, such as a cable broadcast or a satellite broadcast, provided by the MVPD 101. The broadcaster 100 may transmit a real-time broadcast service 110 and enhancement data (or additional data) 120 together. In this case, as shown in FIG. 1, the receiver 103 may receive only the real-time broadcast service 110 and may not receive the enhancement data 120 through the MVPD 101 and the STB 102.

Accordingly, in order to receive the enhancement data 120, the receiver 103 analyzes and processes A/V content output as the real-time broadcast service 110 and identifies broadcast program information and/or broadcast program related metadata. Using the identified broadcast program information and/or broadcast program related metadata, the receiver 103 may receive the enhancement data from the broadcaster 100 or the ACR server 104 (140). In this case, the enhancement data may be transmitted via an Internet protocol (IP) network 150.

If the enhancement data is received from a separate ACR server 104 (140), in a mechanism between the ACR server 104 and the receiver 103, a request/response model among triggered declarative object (TDO) models defined in the ATSC 2.0 standard may be applied to the ACR server 104. Hereinafter, the TDO and request/response model will be described.

TDO indicates additional information included in broadcast content. TDO serves to timely triggers additional information within broadcast content. For example, if an audition program is broadcast, a current ranking of an audition participant preferred by a viewer may be displayed along with the broadcast content. At this time, additional information of the current rating of the audition participant may be a TDO. Such a TDO may be changed through interaction with viewers or provided according to viewer's intention.

In the request/response ACR model of the standard ATSC 2.0, the digital broadcast receiver (103) is expected to generate signatures of the content periodically (e.g. every 5 seconds) and send requests containing the signatures to the ACR server (104). When the ACR server (104) gets a request from the digital broadcast receiver (103), it returns a response. The communications session is not kept open between request/response instances. In this model, it is not feasible for the ACR server (104) to initiate messages to the client.

However, in the above-described ETV service system, an ACR function may not be provided without a separate ACR server. Therefore, there is a need for a method of independently performing an ACR function at a receiver without a separate ACR server.

Figure 2:
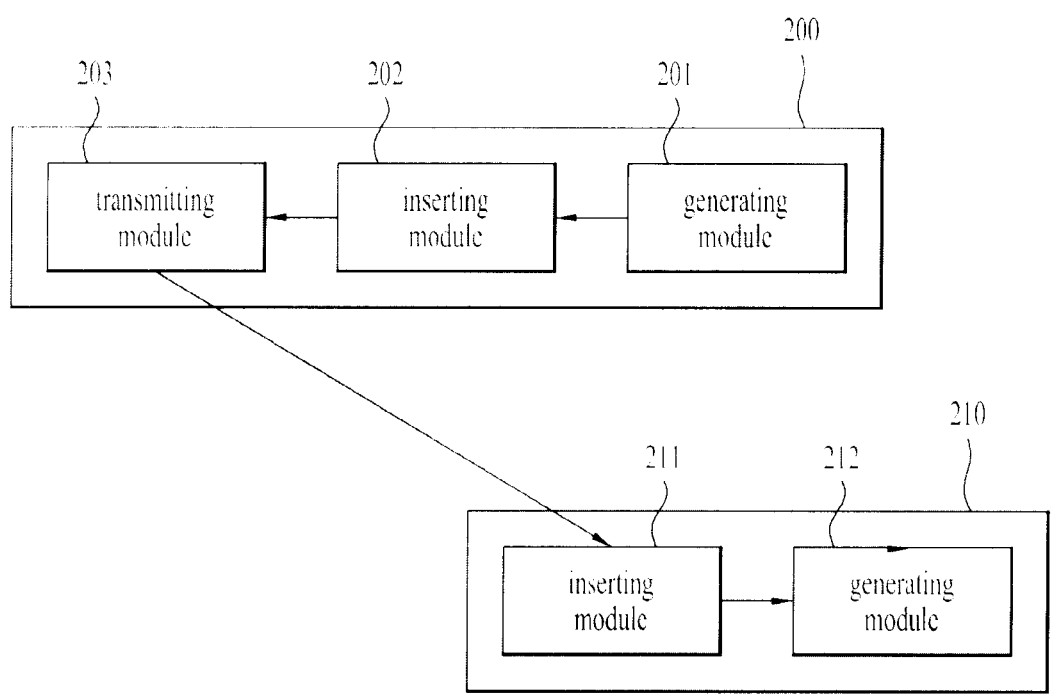
FIG. 2 is a diagram showing an ACR service processing system according to an embodiment of the present invention.

FIG. 2 is a diagram showing an ACR service processing system according to an embodiment of the present invention.

According to the ACR service processing system shown in FIG. 2, enhancement data related to a real-time broadcast may be received using watermarking without intervention of an ACR server to provide an interactive service.

The ACR service processing system shown in FIG. 2 may include a transmitter 200 for generating and transmitting a digital service signal and/or a receiver 210 for receiving and processing a digital service signal. The transmitter 200 may be a content provider or a broadcaster and the receiver 210 may be a receiver such as a digital TV receiver. The transmitter 200 may include a generating module 201, an inserting module 202 and/or a transmitting module 203. The receiver 210 may include a receiving module 211 and/or an extracting module 212.

Hereinafter, operation of each module of the ACR service processing system shown in FIG. 2 will be described.

First, the generating module 201 of the transmitter 200 may generate a watermark and insert the watermark into a frame of A/V content to be transmitted. The watermark may include information about a channel of the content, into which the watermark is inserted, and/or content information (or metadata) such as URL information of enhancement data of content. The transmitting module 203 may transmit the content, into which the watermark is inserted, to the receiver 210.

The receiving module 211 of the receiver 210 may receive the content, into which the watermark is inserted, and deliver the content to the extracting module 212. The extracting module 212 may extract the inserted watermark from an A/V frame of the delivered content.

Figure 3:
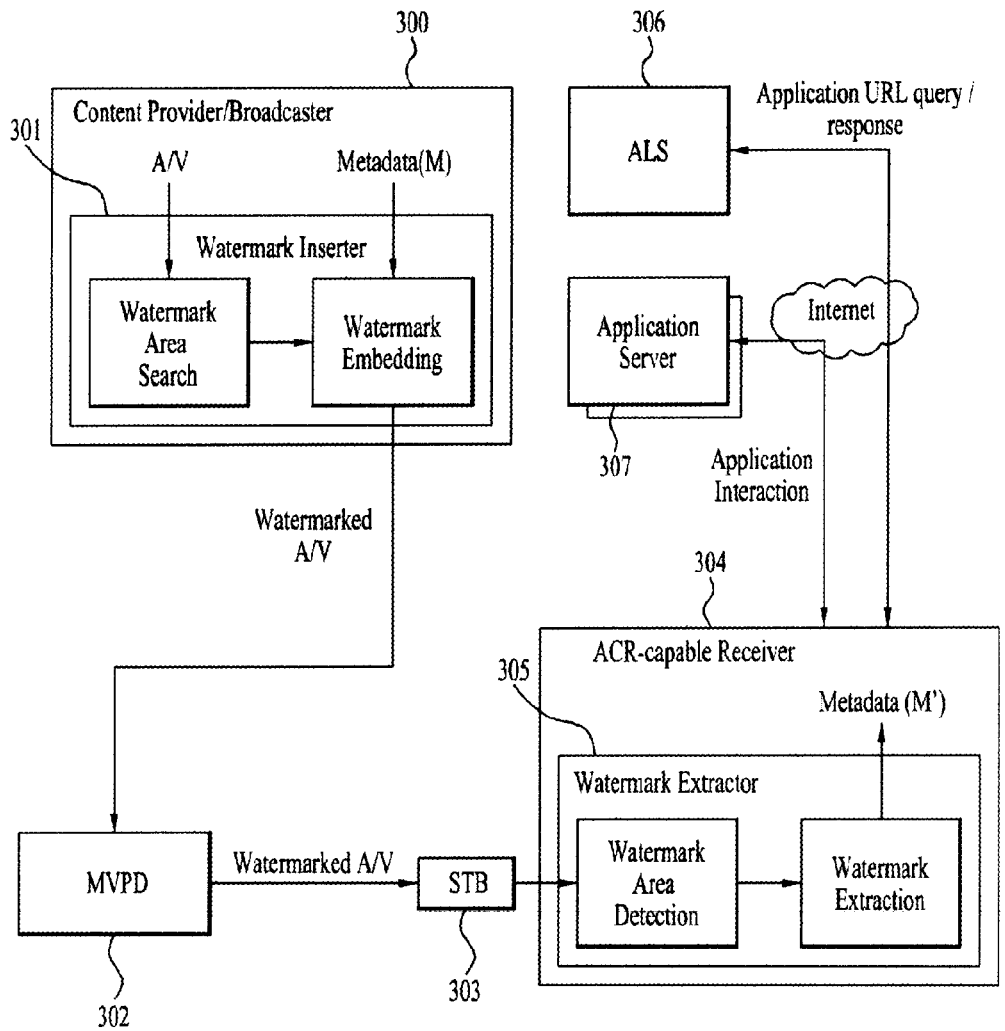
FIG. 3 is a diagram showing an ACR service processing system according to another embodiment of the present invention.

FIG. 3 is a diagram showing an ACR service processing system according to another embodiment of the present invention.

More specifically, FIG. 3 shows an architecture of a broadcast service supporting an ACR based ETV service.

As shown in FIG. 3, the ACR service processing system may include a content provider or broadcaster 300, an MVPD 302, a set-top box 303, a receiver 304, an application URL lookup server (ALS) 306 and an application server (AS) 307. The content provider 300 may include a watermark inserter 301 and the receiver 304 may include a watermark extractor 305. The ALS 306 and the AS 307 are physically subordinate to one server.

The receiver 304 shown in FIG. 3 has an ACR function.

The content provider 300 may insert metadata related to enhancement data into A/V content transmitted in real time in the form of a watermark. Even when A/V content is received via the MVPD 302, A/V content, into which metadata related to enhancement data is inserted in the form of a watermark, may be received. The receiver 304 having the ACR function may extract the watermark from the A/V content received through the MVPD 302 and recognize information about a program broadcast in real time and metadata. The receiver 304 may receive enhancement data via an IP network.

Hereinafter, operation of each component shown in FIG. 3 will be described.

The broadcaster 304 may insert metadata related to enhancement data such as a content ID for identifying content into A/V content in the form of a watermark. More specifically, the watermark inserter 301 searches the A/V content for an area, into which the watermark will be appropriately inserted, and inserts the watermark into the searched area.

The receiver 304 having an ACR function may receive A/V content, into which the watermark is inserted, through the MVPD 302 and the set-top box 303, extract the watermark from the A/V content and obtain metadata related to the enhancement data. More specifically, the watermark extractor 305 of the receiver 304 may search the received A/V content for the area, into which the watermark is inserted, and extract the watermark inserted into the searched area.

The receiver 304 may download the enhancement data related to a real-time broadcast program via the metadata obtained from the extracted watermark. More specifically, the receiver 304 may access the ALS 306 via the IP network to receive a URL of an associated application according to a query. According to the URL of the application, the receiver 304 may access the AS 306 for managing the application and download the enhancement data subordinate to the application from the AS 306.

Figure 4:
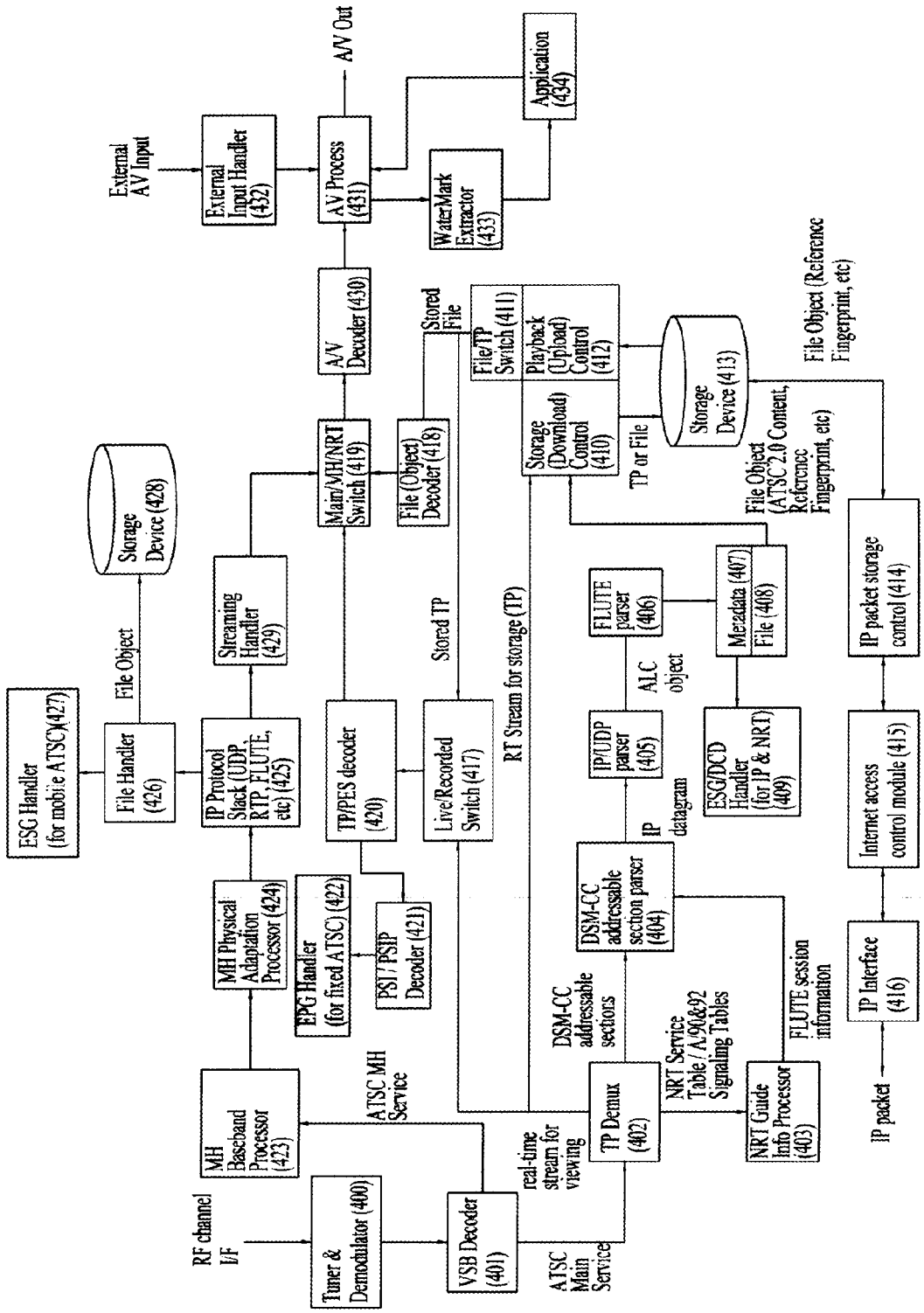
FIG. 4 is a diagram showing the structure of a receiver according to an embodiment of the present invention.

FIG. 4 is a diagram showing the structure of a receiver according to an embodiment of the present invention.

More specifically, FIG. 4 shows an embodiment of the configuration of a receiver supporting an ACR based ETV service using watermarking.

As shown in FIG. 4, the receiver supporting the ACR based ETV service according to the embodiment of the present invention may include an input data processor, an ATSC main service processor, an ATSC mobile/handheld (MH) service processor and/or an ACR service processor. The input data processor may include a tuner/demodulator 400 and/or a vestigial side band (VSB) decoder 401. The ATSC main service processor may include a transport protocol (TP) demux 402, a Non Real Time (NRT) guide information processor 403, a digital storage media command and Control (DSM-CC) addressable section parser 404, an Information Provider (IP)/User Datagram Protocol (UDP) parser 405, a FLUTE parser 406, a metadata module 407, a file module 408, an electronic service guide (ESG)/data carrier detect (DCD) handler 409, a storage control module 410, a file/TP switch 411, a playback control module 412, a first 1 storage device 413, an IP packet storage control module 414, an Internet access control module 415, an IP interface 416, a live/recorded switch 417, a file (object) decoder 418, a TP/Packetized Elementary Stream (PES) decoder 420, a Program Specific Information (PSI)/program and system information protocol (PSIP) decoder 421 and/or an Electronic Program Guide (EPG) handler 422. The ATSC MH service processor may include a main/MH/NRT switch 419, a MH baseband processor 423, an MH physical adaptation processor 424, an IP protocol stack 425, a file handler 426, an ESG handler 427, a second storage device 428 and/or a streaming handler 429. The ACR service processor may include a main/MH/NRT switch 419, an A/V decoder 430, an A/V process module 431, an external input handler 432, a watermark extractor 433 and/or an application 434.

Hereinafter, operation of each module of each processor will be described.

In the input data processor, the tuner/demodulator 400 may tune and demodulate a broadcast signal received from an antenna. Through this process, a VSB symbol may be extracted. The VSB decoder 401 may decode the VSB symbol extracted by the tuner/demodulator 400.

The VSB decoder 401 may output ATSC main service data and MH service data according to decoding. The ATSC main service data may be delivered to and processed by the ATSC main service processor and the MH service data may be delivered to and processed by the ATSC MH service processor.

The ATSC main service processor may process a main service signal in order to deliver main service data excluding an MH signal to the ACR service processor. The TP demux 402 may demultiplex transport packets of ATSC main service data transmitted via the VSB signal and deliver the demultiplexed transport packets to other processing modules. That is, the TP demux 402 may demultiplex a variety of information included in the transport packets and deliver information such that elements of the broadcast signal are respectively processed by modules of the broadcast receiver. The demultiplexed data may include real-time streams, DSM-CC addressable sections and/or an NRT service table/A/90&92 signaling table. More specifically, as shown in FIG. 4, the TP demux 402 may output the real-time streams to the live/recorded switch 417, output the DSM-CC addressable sections to the DSM-CC addressable section parser 404 and output the NRT service table/A/90&92 signaling table to the NRT guide information processor 403.

The NRT guide information processor 403 may receive the NRT service table/A/90&92 signaling table from the TP demux 402 and extract and deliver FLUT session information to the DSM-CC addressable section parser 404. The DSM-CC addressable section parser 404 may receive the DSM-CC addressable sections from the TP demux 402, receive the FLUT session information from the NRT guide information processor 403 and process the DSM-CC addressable sections. The IP/UDP parser 405 may receive the data output from the DSM-CC addressable section parser 404 and parse IP datagrams transmitted according to the IP/UDP. The FLUTE parser 406 may receive data output from the IP/UDP parser 405 and process FLUTE data for transmitting a data service transmitted in the form of an asynchronous layered coding (ALC) object. The metadata module 407 and the file module 408 may receive the data output from the FLUTE parser 406 and process metadata and a restored file. The ESG/DCD handler 409 may receive data output from the metadata module 407 and process an electronic service guide and/or downlink channel descriptor related to a broadcast program. The restored file may be delivered to the storage control module 410 in the form of a file object such as ATSC 2.0 content and reference fingerprint. The file object may be processed by the storage control module 410 and divided into a normal file and a TP file to be stored in the first storage device 413. The playback control module 412 may update the stored file object and deliver the file object to the file/TP switch 411 in order to decode the normal file and the TP file. The file/TP switch 411 may deliver the normal file to the file decoder 418 and deliver the TP file to the live/recorded switch 417 such that the normal file and the TP file are decoded through different paths.

The file decoder 418 may decode the normal file and deliver the decoded file to the ACR service processor. The decoded normal file may be delivered to the main/MH/NRT switch 419 of the ACR service processor. The TP file may be delivered to the TP/PES decoder 420 under the control of the live/recorded switch 417. The TP/PES decoder 420 decodes the TP file and the PSI/PSIP decoder 421 decodes the decoded TP file again. The EPG handler 422 may process the decoded TP file and process an EPG service according to ATSC.

The ATSC MH service processor may process the MH signal in order to transmit ATSC MH service data to the ACR service processor. More specifically, the MH baseband processor 423 may convert the ATSC MH service data signal into a pulse waveform suitable for transmission. The MH physical adaptation processor 424 may process the ATSC MH service data in a form suitable for an MH physical layer.

The IP protocol stack module 425 may receive the data output from the MH physical adaption processor 424 and process data according to a communication protocol for Internet transmission/reception. The file handler 426 may receive the data output from the IP protocol stack module 425 and process a file of an application layer. The ESG handler 427 may receive the data output from the file handler 426 and process a mobile ESG. In addition, the second storage device 428 may receive the data output from the file handler 426 and store a file object. In addition, some of the data output from the IP protocol stack module 425 may become data for an ACR service of the receiver instead of a mobile ESG service according to ATSC. In this case, the streaming handler 429 may process real streaming received via a real-time transport protocol (RTP) and deliver the real streaming to the ACR service processor.

The main/MH/NRT switch 419 of the ACR service processor may receive the signal output from the ATSC main service processor and/or the ATSC MH service processor. The A/V decoder 430 may decode compression A/V data received from the main/MH/NRT switch 419. The decoded A/V data may be delivered to the A/V process module 431.

The external input handler 432 may process the A/V content received through external input and transmit the A/V content to the A/V process module 431.

The A/V process module 431 may process the A/V data received from the A/V decoder 430 and/or the external input handler 432 to be displayed on a screen. In this case, the watermark extractor 433 may extract data inserted in the form of a watermark from the A/V data. The extracted watermark data may be delivered to the application 434. The application 434 may provide an enhancement service based on an ACR function, identify broadcast content and provide enhancement data associated therewith. If the application 434 delivers the enhancement data to the A/V process module 431, the A/V process module 431 may process the received A/V data to be displayed on a screen.

Figure 5:
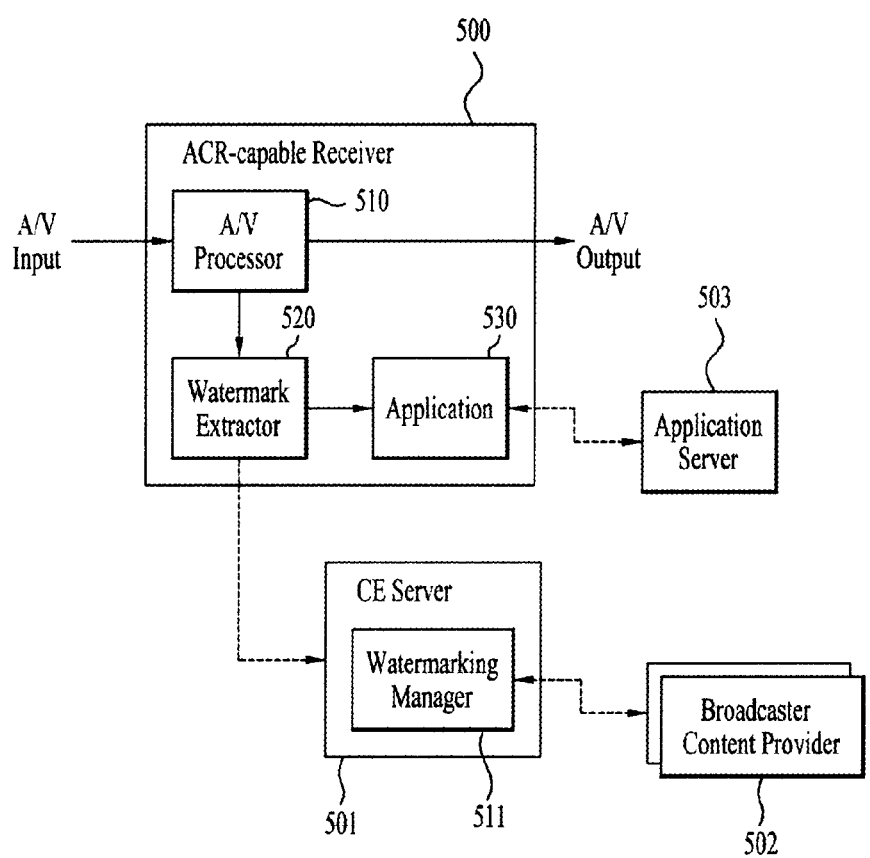
FIG. 5 is a diagram showing the structure of an ACR service processing system according to an embodiment of the present invention.

FIG. 5 is a diagram showing the structure of an ACR service processing system according to an embodiment of the present invention.

More specifically, FIG. 5 shows operation for acquiring program information using a watermark if a receiver 500 receives a terrestrial channel through external input of an external device such as a set-top box.

The ACR service processing system shown in FIG. 5 may include a receiver 500, a CE server 501, a broadcaster or content provider 502 and an application server 503. The receiver 500 may include an A/V processor 510, a watermark extractor 520 and an application module 530. The CE server 501 may include a watermarking manager 511. In addition, the receiver 500 may have an ACR function.

The A/V processor 510 delivers A/V content received through external input to the watermark extractor 520 and the watermark extractor 520 may extract data inserted in the form of a watermark from the A/V content and access the application server 503. At this time, the CE server 501 may manage a watermarking related module and micro-code.

The micro-code according to one embodiment of the present invention refers to code for extracting a watermark inserted into A/V content and may be dynamically downloaded by an A/V decoder chip and/or a raw data processing chip. The receiver may compress and store one or a plurality of micro-codes as necessary or download one or a plurality of micro-codes through a download interface. The download interface may be differently implemented according to chip type.

Hereinafter, operation of each component shown in FIG. 5 will be described.

The watermark extractor 520 of the receiver 500 may extract a watermark from audio content or video content or extract a watermark using audio content and video content. The extracted watermark may include channel information and/or content information. The content information may include information about content used in an ATSC 2.0 service.

The application module 530 may tune to a channel for transmitting content associated with the channel and/or metadata based on channel information and content information extracted from the watermark and receive content information. In addition, the application module 530 may receive content and/or metadata associated with the channel via an IP network. According to one embodiment of the present invention, the channel may include an ATSC message handler (MH) channel.

The CE server 501 may manage and update a watermarking related micro-code and/or software. That is, the CE server 501 may continuously add, delete or update related micro-code and/or software according to a protocol of the broadcaster 500. If a request is received from the receiver 500 or the CE server 501 is updated, the CE server 501 may inform the receiver 500 that the request is received or the CE server 501 is updated and download a new code.

The watermark extractor 520 may be implemented as micro-code or software module operating on a chip of the receiver 500. The new micro-code or software module may be continuously downloaded from the CE server 501.

Figure 6:
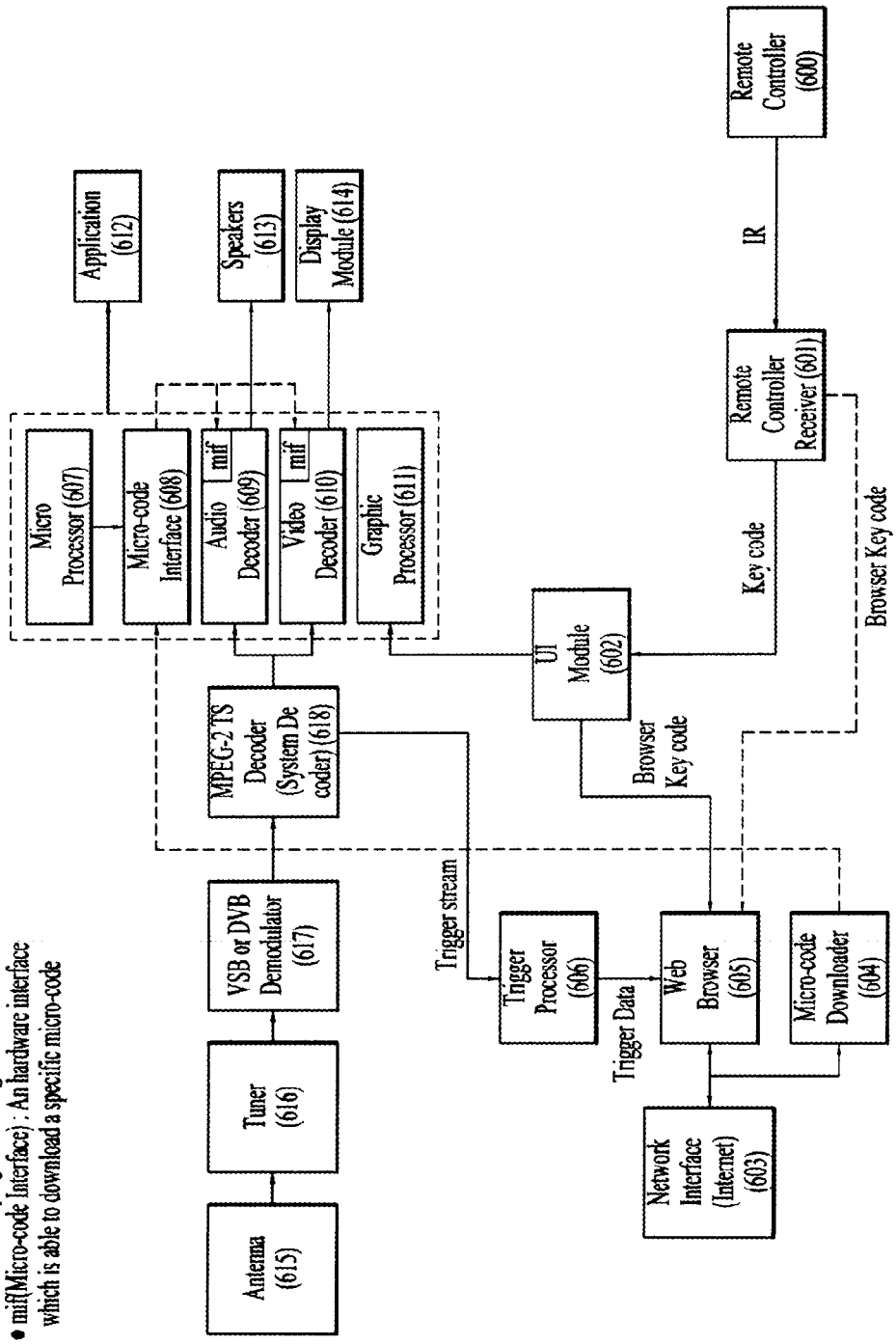
FIG. 6 is a diagram showing the structure of an ETV service reception apparatus according to an embodiment of the present invention.
Figure 7:
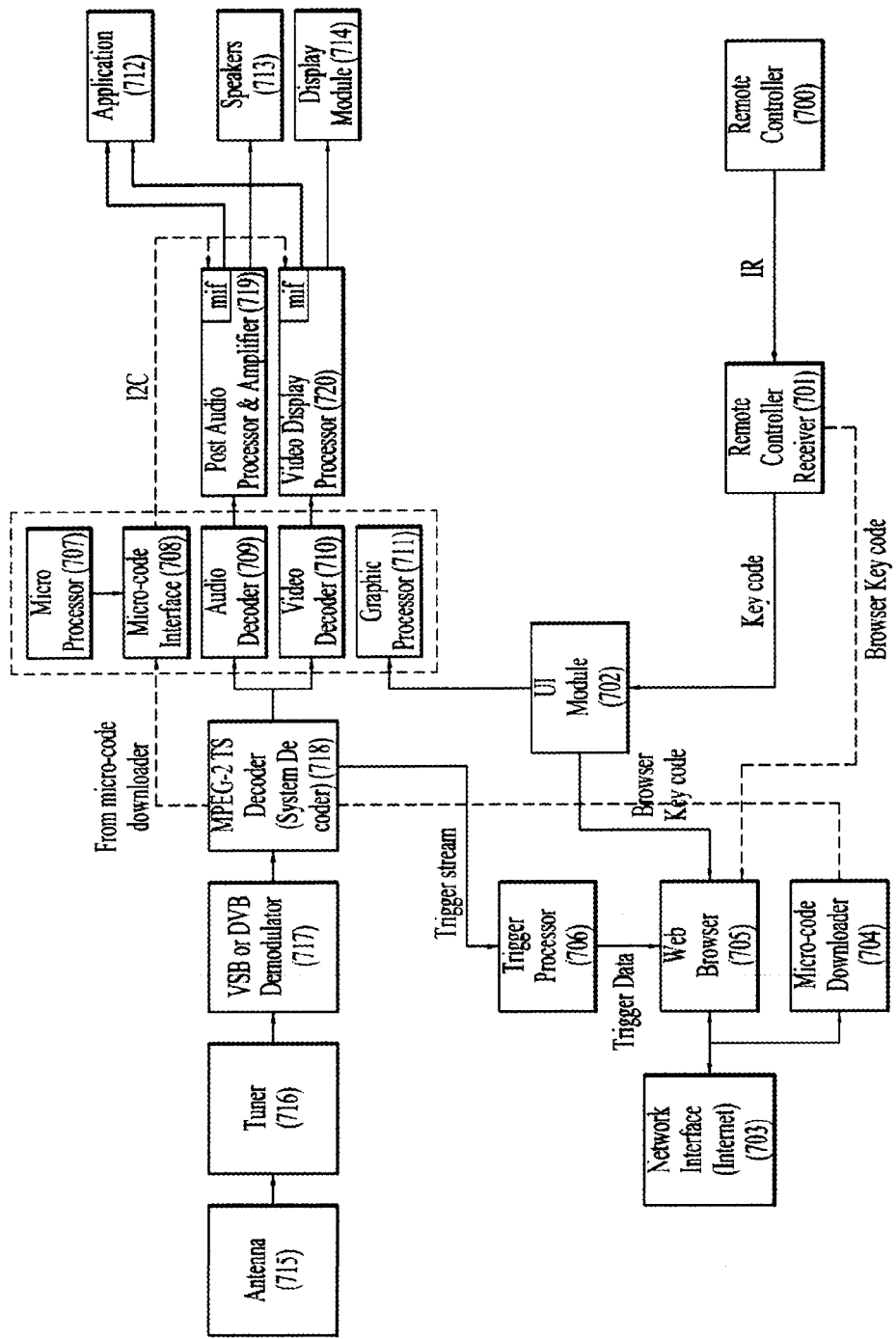
FIG. 7 is a diagram showing the structure of an ETV service reception apparatus according to another embodiment of the present invention.
Figure 8:
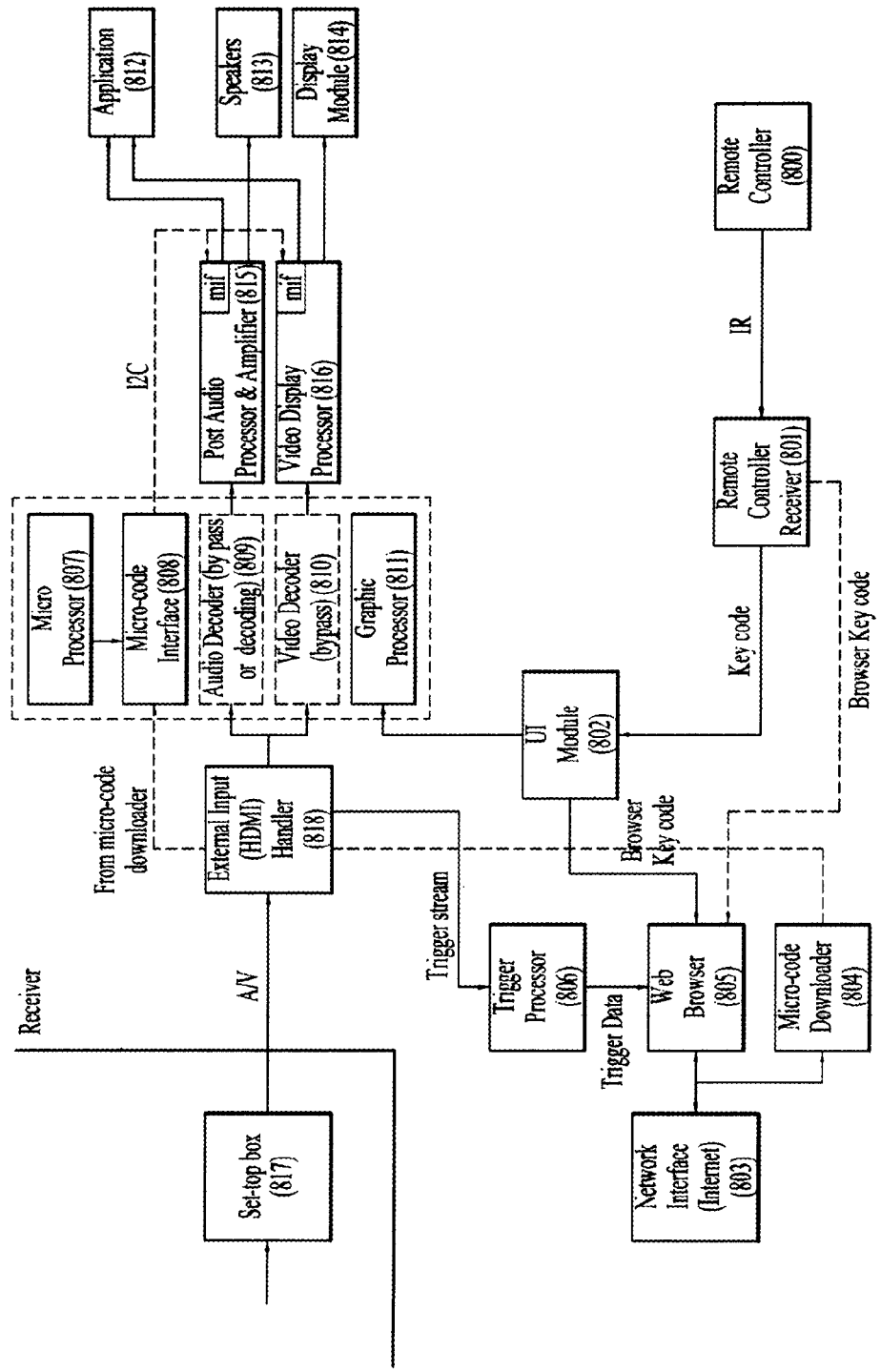
FIG. 8 is a diagram showing the structure of an ETV service reception apparatus according to another embodiment of the present invention.

FIGS. 6 to 8 are diagrams showing the structure of an ETV service reception apparatus according to an embodiment of the present invention.

FIGS. 6 to 8 are diagrams showing the structure of a receiver for extracting a watermark inserted into content in real time based on micro-code in a chip of a video decoder and/or an audio decoder and recognizing content based on the watermark. Hereinafter, the embodiment of the present invention will be described with reference to FIGS. 6 to 8.

FIG. 6 is a diagram showing the structure of an ETV service reception apparatus according to an embodiment of the present invention.

The ETV service reception apparatus according to the embodiment of the present invention shown in FIG. 6 may include a remote controller 600, a remote controller receiver 601, a UI module 602, a network interface 603, a micro-code downloader 604, a web browser 605, a trigger processor 606, a micro processor 607, a micro-code interface (mif) 608, an audio decoder 609, a video decoder 610, a graphics processor 611, an application 612, a speaker 613, a display module 614, an antenna 615, a tuner 616, a demodulator 611, and/or a system decoder 618. The system decoder 618 may be an MPEG-2 TS decoder. The demodulator 617 may be a VSB demodulator or a digital video broadcasting (DVB) demodulator. Each of the audio decoder 609 and the video decoder 610 may include a micro-code interface 608.

As shown in FIG. 6, the ETV service reception apparatus may extract a watermark from A/V content transmitted through a terrestrial wave in real time using micro-code running on a chip of a video decoder or an audio decoder, transmit the extracted watermark to an application and receive an enhancement service. The micro-code may be downloaded from an external device through the micro-code downloader 604. The micro-code may be dynamically downloaded on the chip of the video decoder 609 or the audio decoder 610 via the micro-code interface 608.

Hereinafter, operation between components of the ETV service reception apparatus shown in FIG. 6 will be described.

The remote controller receiver 601 may receive a request signal of a viewer through infrared (IR) light from the remote controller 600 and transmit the signal to the UI module 602 using a key code. The UI module 602 and/or the remote controller receiver 601 may deliver the signal to the web browser 605 using a browser key code. The signal passing through the UI module 602 may be delivered to the graphics processor 601.

The tuner 616 tunes the signal received from the antenna 615 and the demodulator 617 may restore the waveform of the tuned signal. The decoder 618 may decode the restored signal and deliver the decoded signal to the trigger processor 606. The trigger processor 606 may process the decoded signal to trigger data and transmit the trigger data to the web browser 605.

If the signal delivered to the web browser 605 is delivered to the micro-code downloader 604, the micro-code may be downloaded and delivered to the micro-code interface 608. The micro-code passing through the micro-code interface 608 and the decoded signal may be divided into an audio signal and a video signal which are respectively delivered to the audio decoder 609 and the video decoder 610. The micro-code interface 619 of the audio decoder 609 and the video decoder 610 may extract the watermark inserted into A/V content using the micro-code.

The extracted watermark may be delivered to the application 612, the audio signal may be delivered to the speaker 613 and the video signal may be output to the display module 614 along with the graphic signal received from the graphics processor 611.

FIG. 7 is a diagram showing the structure of an ETV service reception apparatus according to another embodiment of the present invention.

The ETV service reception apparatus according to the embodiment of the present invention shown in FIG. 7 may include a remote controller 700, a remote controller receiver 701, a UI module 702, a network interface 703, a micro-code downloader 704, a web browser 705, a trigger processor 706, a micro processor 707, a micro-code interface (mif) 708, an audio decoder 709, a video decoder 710, a graphics processor 711, an application 712, a speaker 713, a display module 714, an antenna 715, a tuner 716, a demodulator 717, a system decoder 718, an audio postprocessor and amplifier 719 and/or a video display processor 720. According to the embodiment of the present invention, the system decoder 718 may include an MPEG-2 TS decoder. According to the embodiment of the present invention, the demodulator 717 may include a VSB demodulator and/or a DVB demodulator. Each of the audio postprocessor and amplifier 719 and the video display processor 720 may include the micro-code interface 708.

As shown in FIG. 7, the ETV service reception apparatus may extract a watermark inserted into A/V content through micro-code in real time on a post-processing chip instead of the chip of the audio decoder or the video decoder. According to the embodiment of the present invention, the postprocessing chip may include the audio postprocessor and amplifier 719 and the video display processor 720. The ETV service reception apparatus may automatically recognize the A/V content using the extracted watermark. The ETV service reception apparatus may download the micro-code from an external device through the micro-code downloader 704. In addition, the audio or video postprocessing chip of the ETV service reception apparatus may download the micro-code through the micro-code interface 708.

Hereinafter, operation between the components of the ETV service reception apparatus shown in FIG. 7 will be described.

The remote controller receiver 701 may receive a request signal of a viewer through infrared (IR) light from the remote controller 700 and transmit the received signal to the UI module 702 using a key code. The UI module 702 and/or the remote controller receiver 701 may deliver the signal to the web browser 705 using a browser key code. The signal passing through the UI module 702 may be delivered to the graphics processor 701.

The tuner 716 tunes the signal received from the antenna 715 and the demodulator 717 may restore the waveform of the tuned signal. The decoder 718 may decode the restored signal and deliver the decoded signal to the trigger processor 706. The trigger processor 706 may process the decoded signal into trigger data and transmit the trigger data to the web browser 705.

If the signal delivered to the web browser 705 is delivered to the micro-code downloader 704, the micro-code may be downloaded and delivered to the micro-code interface 708 of the audio postprocessor and amplifier 718 and/or the display processor 720 through the micro-code interface 708.

The decoded signal may be divided into an audio signal and a video signal, which are respectively delivered to the audio decoder 709 and the video decoder 710. The audio signal decoded by the audio decoder 709 may be delivered to the audio postprocessor and amplifier 719. The video signal decoded by the video decoder 710 may be delivered to the video display processor 720.

If the micro-code interface 708 of the audio postprocessor and amplifier 718 and/or the display processor 720 receives the audio signal and/or the video signal through the micro-code interface 708, the watermark inserted into audio and/or video content may be extracted through the micro-code.

The extracted watermark may be delivered to the application 712, the audio signal may be output to the speaker 713 and the video signal may be output to the display module 714.

FIG. 8 is a diagram showing the structure of an ETV service reception apparatus according to another embodiment of the present invention.

The ETV service reception apparatus according to the embodiment of the present invention shown in FIG. 8 may include a remote controller 800, a remote controller receiver 801, a UI module 802, a network interface 803, a micro-code downloader 804, a web browser 805, a trigger processor 806, a micro processor 807, a micro-code interface (mif) 808, an audio decoder 809, a video decoder 810, a graphics processor 811, an application 812, a speaker 813, a display module 814, an audio postprocessor and amplifier 815, a set-top box 817 and an external input handler 818. The external input handler 818 may receive external input through a high definition multimedia interface (HDMI).

As shown in FIG. 8, the ETV service reception apparatus may automatically recognize A/V content using micro-code and receive an ETV service even when the A/V content is not transmitted through a terrestrial wave but is received via an external device such as the set-top box 817. That is, if A/V content is received from an external device, the ETV service reception apparatus may extract a watermark from the A/V content using micro-code in real time. At this time, a video or audio post-processing chip may download the micro-code through the micro-code interface 808. The extracted watermark may be delivered to the application 812 and the receiver may acquire enhancement data using data included in the watermark. According to the embodiment of the present invention, the post-processing chip may include the audio postprocessor and amplifier 815 and/or the video display processor 816.

Hereinafter, operation between the components of the ETV service reception apparatus shown in FIG. 8 will be described.

The remote controller receiver 801 may receive a request signal of a viewer through infrared (IR) light from the remote controller 800 and transmit the received signal to the UI module 802 using a key code. The UI module 802 and/or the remote controller receiver 801 may deliver the signal to the web browser 805 using a browser key code. If the signal delivered to the web browser 805 is delivered to the micro-code downloader 804, the ETV service reception apparatus may download the micro-code and deliver the micro-code to the micro-code interface 808. The signal passing through the UI module 802 may be delivered to the graphics processor 8701.

The signal received from the external device through the set-top box may be processed into trigger data through the trigger processor 806 without being decoded through the external input handler 818 and may be delivered to the web browser 805. Alternatively, the external input signal passing through the external input handler 818 may be divided into an audio signal and a video signal which are respectively delivered to the audio decoder 809 and the video decoder 810. At this time, the audio decoder 809 may decode the audio signal.

The decoded audio signal may be delivered to the audio postprocessor and amplifier 819 and the decoded video signal may be delivered to the video display processor 816. The micro-code interface 808 of the audio postprocessor and amplifier 819 and the display processor 816 may extract the watermark inserted into audio and/or video content using the micro-code.

The extracted watermark may be delivered to the application 812, the audio signal may be output to the speaker 813 and the video signal may be output to the display module 814.

Figure 9:
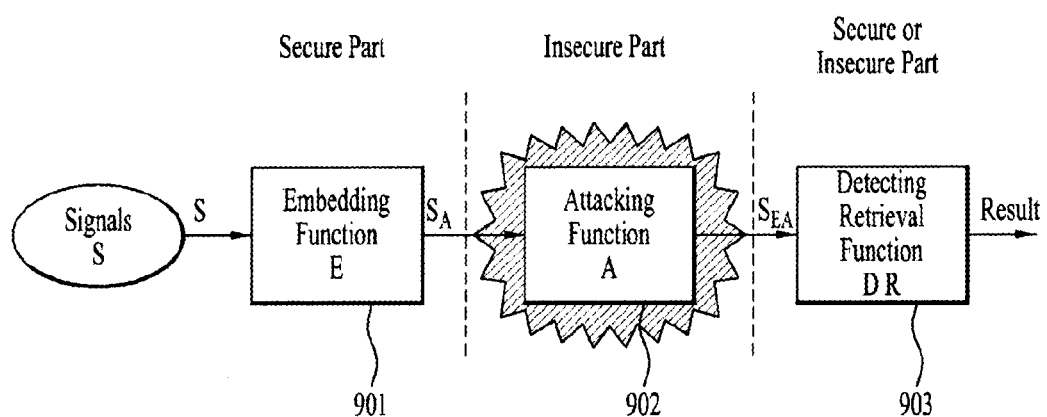
FIG. 9 is a diagram showing the flow of digital watermarking technology according to an embodiment of the present invention.

FIG. 9 is a diagram showing the flow of digital watermarking technology according to an embodiment of the present invention.

Digital watermarking is the process of embedding information into a digital signal in a way that is difficult to remove. The signal may be audio, pictures or video, for example. If the signal is copied, then the information is also carried in the copy. A signal may carry several different watermarks at the same time.

In visible watermarking, the information is visible in the picture or video. Typically, the information is text or a logo which identifies the owner of the media. When a television broadcaster adds its logo to the corner of transmitted video, this is also a visible watermark.

In invisible watermarking, information is added as digital data to audio, picture or video, but it cannot be perceived as such, although it may be possible to detect that some amount of information is hidden. The watermark may be intended for widespread use and is thus made easy to retrieve or it may be a form of Steganography, where a party communicates a secret message embedded in the digital signal. In either case, as in visible watermarking, the objective is to attach ownership or other descriptive information to the signal in a way that is difficult to remove. It is also possible to use hidden embedded information as a means of covert communication between individuals.

One application of watermarking is in copyright protection systems, which are intended to prevent or deter unauthorized copying of digital media. In this use a copy device retrieves the watermark from the signal before making a copy; the device makes a decision to copy or not depending on the contents of the watermark. Another application is in source tracing. A watermark is embedded into a digital signal at each point of distribution. If a copy of the work is found later, then the watermark can be retrieved from the copy and the source of the distribution is known. This technique has been reportedly used to detect the source of illegally copied movies.

Annotation of digital photographs with descriptive information is another application of invisible watermarking.

While some file formats for digital media can contain additional information called metadata, digital watermarking is distinct in that the data is carried in the signal itself.

The information to be embedded is called a digital watermark, although in some contexts the phrase digital watermark means the difference between the watermarked signal and the cover signal. The signal where the watermark is to be embedded is called the host signal.

A watermarking system is usually divided into three distinct steps, embedding (901), attack (902) and detection (or extraction; 903).

In embedding (901), an algorithm accepts the host and the data to be embedded and produces a watermarked signal.

The watermarked signal is then transmitted or stored, usually transmitted to another person. If this person makes a modification, this is called an attack (902). While the modification may not be malicious, the term attack arises from copyright protection application, where pirates attempt to remove the digital watermark through modification. There are many possible modifications, for example, lossy compression of the data, cropping an image or video, or intentionally adding noise.

Detection (903) is an algorithm which is applied to the attacked signal to attempt to extract the watermark from it. If the signal was unmodified during transmission, then the watermark is still present and it can be extracted. In robust watermarking applications, the extraction algorithm should be able to correctly produce the watermark, even if the modifications were strong. In fragile watermarking, the extraction algorithm should fail if any change is made to the signal.

A digital watermark is called robust with respect to transformations if the embedded information can reliably be detected from the marked signal even if degraded by any number of transformations. Typical image degradations are JPEG compression, rotation, cropping, additive noise and quantization. For video content temporal modifications and MPEG compression are often added to this list. A watermark is called imperceptible if the watermarked content is perceptually equivalent to the original, unwatermarked content. In general it is easy to create robust watermarks or imperceptible watermarks, but the creation of robust and imperceptible watermarks has proven to be quite challenging. Robust imperceptible watermarks have been proposed as tool for the protection of digital content, for example as an embedded 'no-copy-allowed' flag in professional video content.

Digital watermarking techniques can be classified in several ways.

First, a watermark is called fragile if it fails to be detected after the slightest modification (Robustness). Fragile watermarks are commonly used for tamper detection (integrity proof). Modifications to an original work that are clearly noticeable are commonly not referred to as watermarks, but as generalized barcodes. A watermark is called semi-fragile if it resists benign transformations but fails detection after malignant transformations. Semi-fragile watermarks are commonly used to detect malignant transformations. A watermark is called robust if it resists a designated class of transformations. Robust watermarks may be used in copy protection applications to carry copy and access control information.

Second, a watermark is called imperceptible if the original cover signal and the marked signal are (close to) perceptually indistinguishable (Perceptibility). A watermark is called perceptible if its presence in the marked signal is noticeable, but non-intrusive.

Third, about a capacity, the length of the embedded message determines two different main classes of watermarking schemes:

The message is conceptually zero-bit long and the system is designed in order to detect the presence or the absence of the watermark in the marked object. This kind of watermarking schemes is usually referred to as Italic zero-bit or Italic presence watermarking schemes. Sometimes, this type of watermarking scheme is called 1-bit watermark, because a 1 denotes the presence (and a 0 the absence) of a watermark.

The message is a n-bit-long stream (, with n=|m|) or M={0, 1}n and is modulated in the watermark. This kinds of schemes are usually referred to as multiple bit watermarking or non zero-bit watermarking schemes.

Forth, there are several ways for the embedding step. A watermarking method is referred to as spread-spectrum if the marked signal is obtained by an additive modification. Spread-spectrum watermarks are known to be modestly robust, but also to have a low information capacity due to host interference. A watermarking method is said to be of quantization type if the marked signal is obtained by quantization. Quantization watermarks suffer from low robustness, but have a high information capacity due to rejection of host interference. A watermarking method is referred to as amplitude modulation if the marked signal is embedded by additive modification which is similar to spread spectrum method but is particularly embedded in the spatial domain.

Figure 10:
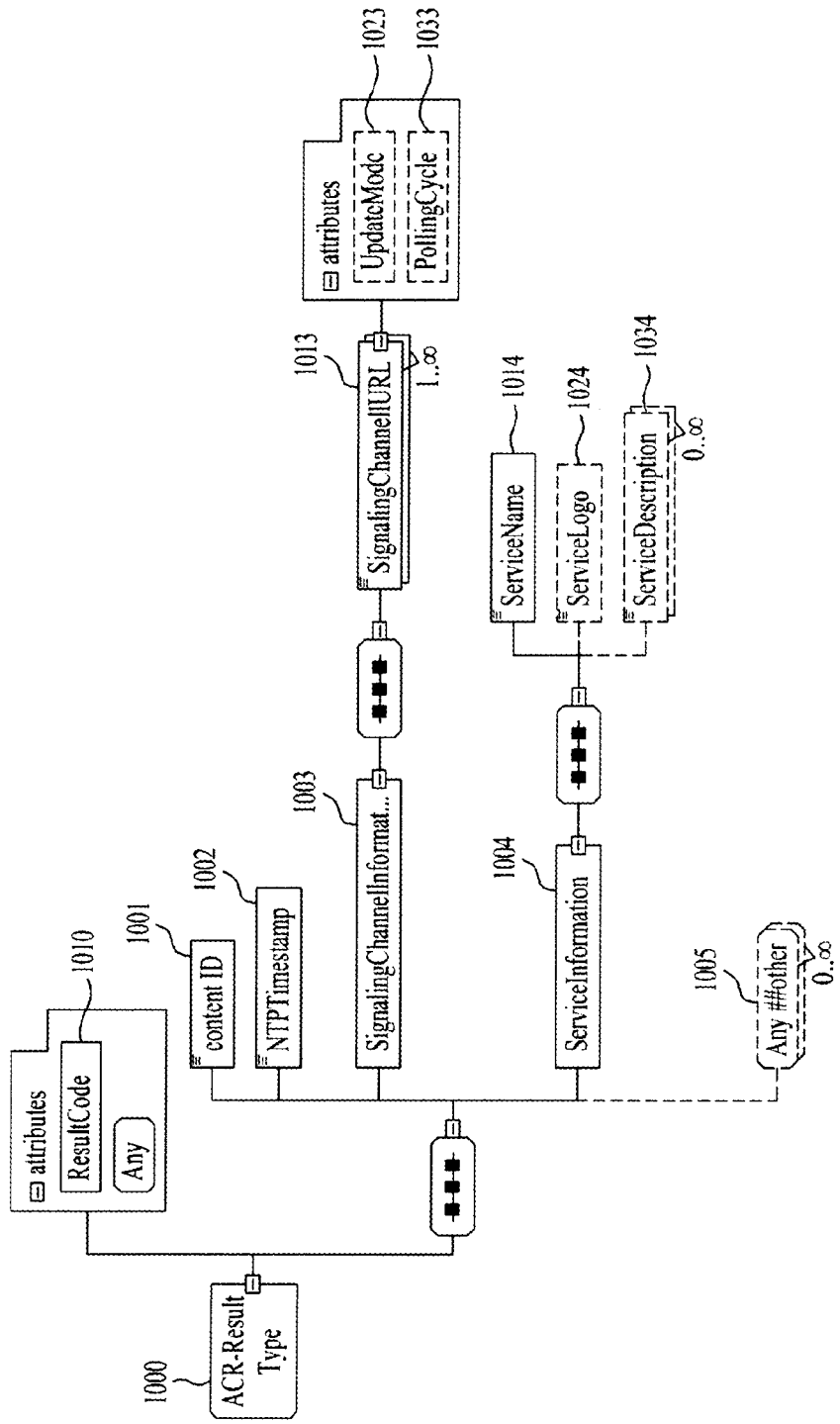
FIG. 10 is a diagram showing an ACR query result format according to an embodiment of the present invention.

FIG. 10 is a diagram showing an ACR query result format according to an embodiment of the present invention.

According to the existing ACR service processing system, if a broadcaster transmits content for a real-time service and enhancement data for an ETV service together and a TV receiver receives the content and the ETV service, the content for the real-time service may be received but the enhancement data may not be received.

In this case, according to the embodiment of the present invention, it is possible to solve problems of the existing ACR processing system through an independent IP signaling channel using an IP network. That is, a TV receiver may receive content for a real-time service via an MVPD and receive enhancement data via an independent IP signaling channel.

In this case, according to the embodiment of the present invention, an IP signaling channel may be configured such that a PSIP stream is delivered and processed in the form of a binary stream. At this time, the IP signaling channel may be configured to use a pull method or a push method.

The IP signaling channel of the pull method may be configured according to an HTTP request/response method. According to the HTTP request/response method, a PSIP binary stream may be included in an HTTP response signal for an HTTP request signal and transmitted through SignalingChannelURL. In this case, a polling cycle may be periodically requested according to Polling_cycle in metadata delivered as an ACR query result. In addition, information about a time and/or a cycle to be updated may be included in a signaling channel and transmitted. In this case, the receiver may request signaling information from a server based on update time and/or cycle information received from the IP signaling channel.

The IP signaling channel of the push method may be configured using an XMLHTTPRequest application programming interface (API). If the XMLHTTPRequest API is used, it is possible to asynchronously receive updates from the server. This is a method of, at a receiver, asynchronously requesting signaling information from a server through an XMLHTTPRequest object and, at the server, providing signaling information via this channel in response thereto if signaling information has been changed. If there is a limitation in standby time of a session, a session timeout response may be generated and the receiver may recognize the session timeout response, request signaling information again and maintain a signaling channel between the receiver and the server.

In order to receive enhancement data through an IP signaling channel, the receiver may operate using watermarking and fingerprinting. Fingerprinting refers to technology for inserting information about a content purchaser into content instead of a content provider. If fingerprinting is used, the receiver may search a reference database to identify content. A result of identifying the content is called an ACR query result. The ACR query result may include a query provided to a TV viewer and answer information of the query in order to implement an ACR function. The receiver may provide an ETV service based on the ACR query result.

Information about the ACR query result may be inserted/embedded into/in A/V content on a watermark based ACR system and may be transmitted. The receiver may extract and acquire ACR query result information through a watermark extractor and then provide an ETV service. In this case, an ETV service may be provided without a separate ACR server and a query through an IP network may be omitted.

FIG. 10 is a diagram of an XML scheme indicating an ACR query result according to an embodiment of the present invention. As shown in FIG. 10, the XML format of the ACR query result may include a result code element 1010 and the ACR query result type 1000 may include a content ID element 1001, a network time protocol (NTP) timestamp element 1002, a signaling channel information element 1003, a service information element 1004 and an other-identifier element 1005. The signaling channel information element 1003 may include a signaling channel URL element 1013, an update mode element 1023 and a polling cycle element 1033, and the service information element 1004 may include a service name element 1014, a service logo element 1024 and a service description element 1034.

Hereinafter, the diagram of the XML schema of the ACR query result shown in FIG. 10 will be described in detail and an example of the XML schema will be described.

The result code element 1010 may indicate a result value of an ACR query. This may indicate query success or failure and a failure reason if a query fails in the form of a code value. For example, if the value of the result code element 1010 is 200, this may indicate that a query succeeds and content information corresponding thereto is returned and, if the value of the result code element 1010 is 404, this may indicate that content is not found.

The content ID element 1001 may indicate an identifier for globally and uniquely identifying content and may include a global service identifier element, which is an identifier for identifying a service.

The NTP timestamp element 1002 may indicate that a time of a specific point of a sample frame interval used for an ACR query is provided in the form of an NTP timestamp. Here, the specific point may be a start point or end point of the sample frame. NTP means a protocol for synchronizing a time of a computer with a reference clock through the Internet and may be used for time synchronization between a time server and client distributed on a computer network. Since NTP uses a universal time coordinated (UTC) time and ensures accuracy of 10 ms, the receiver may accurately process a frame synchronization operation.

The signaling channel information element 1003 may indicate access information of an independent signaling channel on an IP network for an ETV service.

More specifically, the signaling channel URL element 1013, which is a sub element of the signaling channel information element 1003, may indicate URL information of a signaling channel. The signaling channel URL element 1013 may include an update mode element 1023 and a polling cycle element 1033 as sub elements. The update mode element 1023 may indicate a method of acquiring information via an IP signaling channel. For example, in a pull mode, the receiver may periodically perform polling according to a pull method to acquire information and, in a push mode, the server may transmit information to the receiver according to a push method The polling cycle element 1033 may indicate a basic polling cycle value of the receiver according to a pull method if the update mode element 1023 is a pull mode. Then, the receiver may specify a basic polling cycle value and transmit a request signal to the server at a random time interval, thereby preventing requests from overloading in the server.

The service information element 1004 may indicate information about a broadcast channel. The content id element 1001 may indicate an identifier of a service which is currently being viewed by a viewer and the service information element 1004 may indicate detailed information about the broadcast channel. For example, the detailed information indicated by the service information element 1004 may be a channel name, a logo, or a text description.

More specifically, the service name element 1014 which is a sub element of the service information element 1004 may indicate a channel name, the service logo element 1024 may indicate a channel logo, and the service description element 1034 may indicate a channel text description.

The following shows the XML schema of elements of the ACR query result shown in FIG. 10 according to the embodiment of the present invention.

```
<xs:complexType name="ACR-ResultType">
 <xs:sequence>
  <xs:element name="ContentID" type="xs:anyURI"/>
  <xs:element name="NTPTimestamp" type="xs:unsignedLong"/>
  <xs:element name="SignalingChannelInformation">
   <xs:complexType>
    <xs:sequence>
     <xs:element name="SignalingChannelURL" maxOccurs=
"unbounded">
      <xs:complexType>
       <xs:simpleContent>
        <xs:extension base="xs:anyURI">
         <xs:attribute name="UpdateMode">
          <xs:simpleType>
           <xs:restriction base="xs:string">
            <xs:enumeration value="Pull"/>
            <xs:enumeration value="Push"/>
           </xs:restriction>
          </xs:simpleType>
         </xs:attribute>
         <xs:attribute name="PollingCycle" type="xs:unsignedInt"/>
        </xs:extension>
       </xs:simpleContent>
      </xs:complexType>
     </xs:element>
    </xs:sequence>
   </xs:complexType>
  </xs:element>
  <xs:element name="ServiceInformation">
   <xs:complexType>
    <xs:sequence>
     <xs:element name="ServiceName" type="xs:string"/>
     <xs:element name="ServiceLogo" type="xs:anyURI"
minOccurs="0"/>
     <xs:element name="ServiceDescription" type="xs:string"
minOccurs="0" maxOccurs="unbounded"/>
    </xs:sequence>
   </xs:complexType>
  </xs:element>
  <xs:any namespace="##other" processContents="skip" minOccurs="0"
maxOccurs="unbounded"/>
 </xs:sequence>
 <xs:attribute name="ResultCode" type="xs:string" use="required"/>
 <xs:anyAttribute processContents="skip"/>
</xs:complexType>
```

FIG. 11 is a diagram showing the structure of a content identifier (ID) according to an embodiment of the present invention.

FIG. 11 shows the syntax structure of the content ID according to the ATSC standard according to the embodiment of the present invention. The ATSC content ID may be used as an identifier for identifying content received by the receiver.

The ATSC Content Identifier is a structure that is composed of a TSID (Transmitting Subscriber Identification) and a "house number" with a period of uniqueness. A "house number" is any number that the holder of the TSID wishes as constrained herein. Numbers are unique for each value of TSID. The syntax of the ATSC Content Identifier structure shall be as defined in FIG. 11.

'TSID', a 16 bit unsigned integer field, shall contain a value of transport_stream_id. The assigning authority for these values for the United States is the FC Ranges for Mexico, Canada, and the United States have been established by formal agreement among these countries. Values in other regions are established by appropriate authorities.

'end_of_day' field, this 5-bit unsigned integer shall be set to the hour of the day in UTC in which the broadcast day ends and the instant after which the content_id values may be re-used according to unique_for. The value of this field shall be in the range of 0-23. The values 24-31 are reserved. Note that the value of this field is expected to be static per broadcaster.

'unique_for' field, this 9-bit unsigned integer shall be set to the number of days, rounded up, measure relative to the hour indicated by end_of_day, during which the content_id value is not reassign to different content. The value shall be in the range 1 to 511. The value zero shall be forbidden. The value 511 shall have the special meaning of "indefinitely". Note that the value of this field is expected to be essentially static per broadcaster, only changing when the method of house numbering is changed. Note also that decoders can treat stored content_values as unique until the unique_for fields expire, which can be implemented by decrementing all stored unique_for fields by one every day at the end_of_day until they reach zero.

'content_id' field, this variable length field shall be set to the value of the identifier according to the house number system or systems for the value of TSID. Each such value shall not be assigned to different content within the period of uniqueness set by the values in the end_of_day an unique_for fields. The identifier may be any combination of human readable and/or binary values and need not exactly match the form of a house number, not to exceed 242 bytes 1.

Figure 12:
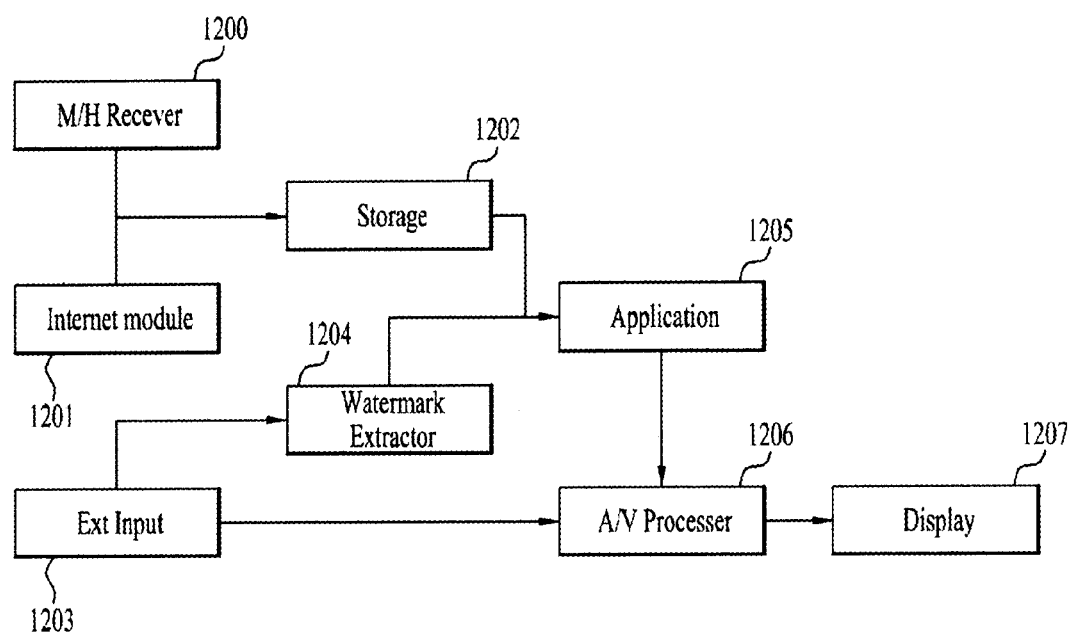
FIG. 12 is a diagram showing operation of a receiver using watermarking according to an embodiment of the present invention.

FIG. 12 is a diagram showing operation of a receiver using watermarking according to an embodiment of the present invention.

As a method of providing an ETV service supporting an ACR function, in the present invention, a method using watermarking is proposed. FIG. 12 is a diagram showing operation between modules of a receiver for performing an ACR function using watermarking.

As shown in FIG. 12, a receiver using watermarking may include a Mobile/Handheld (M/H) receiving module 1200, an Internet module 1201, a storing module 1202, an external input module 1203, a watermark extracting module 1204, an application module 1205, an A/V processing module 1206 and a displaying module 1207.

As shown in FIG. 12, the receiver may recognize a content provider (CP) using a watermark and process an enhancement service provided by the recognized CP.

In the receiver according to the embodiment of the present invention, the watermark extracting module 1204 may extract a watermark from an A/V signal received by the M/H receiving module 1200 through external input and obtain content information included in the A/V signal. The content information, which may be included in the watermark according to the embodiment of the present invention, will be described below.

The extracted content information may be displayed to a viewer through the application module 1205 and the viewer may selectively receive enhancement data for an enhancement service through M/H or Internet using the displayed content information.

Although not shown in FIG. 12, the received enhancement data may be stored in the storing module 1202 to be used for an ACR service. In this case, the content information and metadata are stored in the storing module 1202 and the stored content information and metadata may be used to receive related enhancement data upon A/V playback. Alternatively, the receiver may access the content provider or newly receive enhancement data through M/H tuning upon A/V playback.

Hereinafter, operation of each module shown in FIG. 12 will be described and then content information which may be extracted from the watermark will be described.

The M/H receiving module 1200 may receive enhancement data from the content provider through an M/H signal.

The Internet module 1201 may receive enhancement data from the content provider via the Internet.

The storing module 1201 may store data including A/V information and/or enhancement data received from the content provider. If the watermark extracting module 1204 extracts a watermark, the watermark may be displayed and stored in the storage device as special metadata.

The external input module 1203 may receive an A/V signal of the content provider through external input.

The watermark extracting module 1204 may extract a watermark from the A/V signal received by the external input module 1203. If content is stored in the storage of the TV and is then played back, the watermark may be extracted upon playback.

The application module 1205 may receive the watermark extracted by the watermark extracting module 1204 from data including A/V information and/or enhancement data received from the content provider and stored in the storing module 1201 and process the data including the A/V information and/or the enhancement data using the information about the watermark.

The A/V processing module 1206 may decode the A/V signal through an audio decoder and/or a video decoder to process data received from the application module 1205.

The displaying module 1207 may display the data processed by the A/V processing module 1206 on a screen of the receiver in an on screen display (OSD) manner.

Hereinafter, content information according to one embodiment of the present invention will be described.

The content information extracted through the watermark may include information about a content provider. More specifically, the content information may include ID information of a content provider or a broadcaster, ID information of content, information about a time of content, content life cycle information and/or information about enhancement data. In an ACR service using fingerprinting according to one embodiment of the present invention, an ACR query result may be used as metadata for content acquired via an ACR function.

The CP ID information may mean an identifier for identifying a content provider or a broadcaster. According to the embodiment of the present invention, the CP ID information may serve as a primary identifier. The CP ID information may include a collection of a serial number for identifying a producer name and a producer and/or a serial number for identifying a country, a region and a service property (genre). According to one embodiment of the present invention, a TS-id used for an ATSC program and system information protocol (PSIP) may be used as CP ID information.

The content ID information may mean an identifier for identifying content instead of a content provider. More specifically, the content ID information may include a collection of a serial number for identifying a content name and content and a serial number for identifying a content property (genre). According to one embodiment of the present invention, an event-id used for an ATSC PSIP may be used as content ID information.

The CP ID information may be included in the watermark with a frequency higher than that of the content ID information and may be configured to be more easily extracted. In this case, the CP ID information may include more compressed information or more detailed information.

The time information may indicate time information related to content. More specifically, the time information may include a start time, a duration time, an end time and/or a lead time meaning a total service playback time. According to one embodiment of the present invention, the time information may be based on UTC or GPS and may be configured in another format such as an STT of an ATSC PSIP. In addition, the time information may be used for synchronization in a display process when a service such as a synchronized widget is provided. In addition, the time information may be used for content rescheduled by a cable or satellite personal video recorder (PVR) set-top box.

The content life cycle information may include information about a life cycle within which a service is valid.

The information about the enhancement data may include information about presence/absence of enhancement data and usage of a watermark and/or information about a path for receiving enhancement data. More specifically, the information about the enhancement data may include information about presence of enhancement data provided by a content provider and information indicating whether a watermark is used for a license for preventing illegal copy and distribution, audience rating survey, or content provider recognition for an additional service. Information about a path for receiving enhancement data may include information indicating whether an IP network is used or another medium such as a mobile device is used. More specifically, if enhancement data is received via an IP network, an IP address and/or URL information may be included and, if enhancement data is received via a mobile device, frequency information, standard (ATSC MH, DMB, media flow, DVB-H, NGH, etc.) information and/or channel information may be included.

Figure 13:
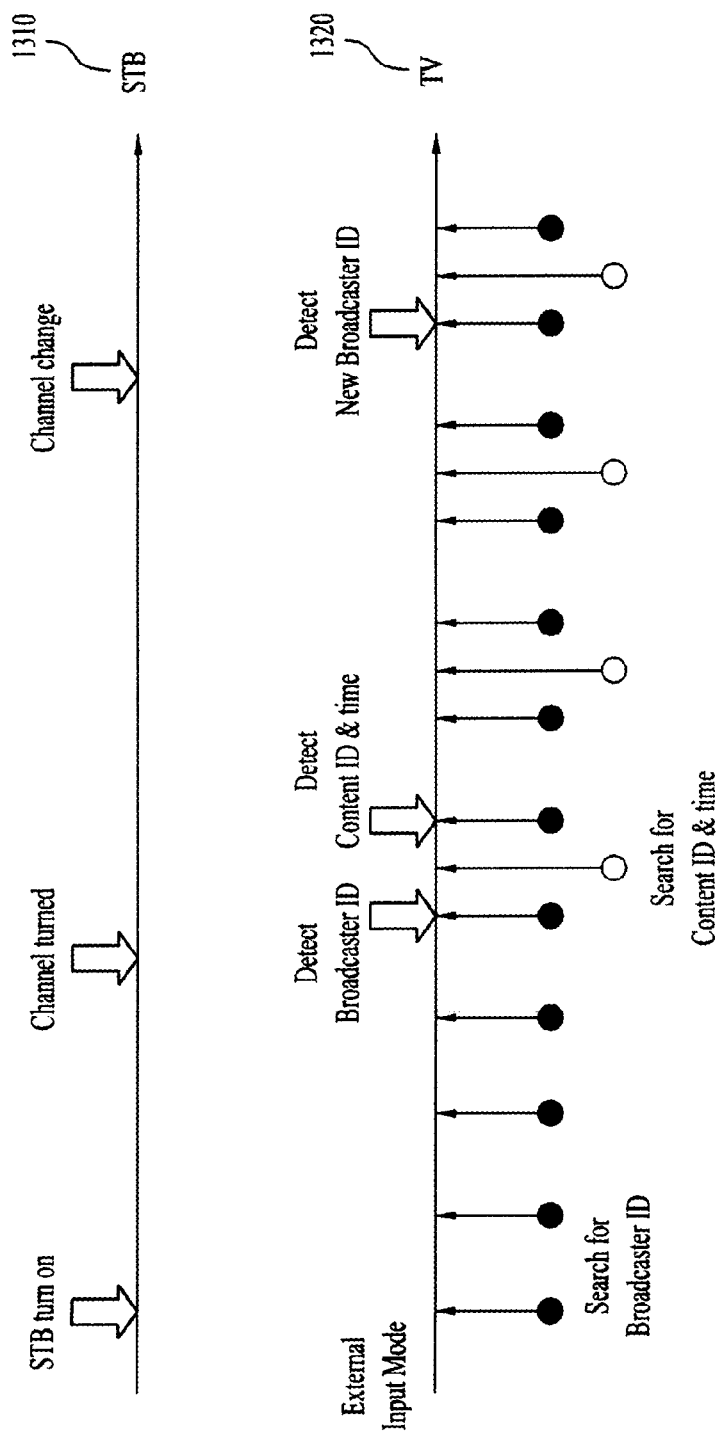
FIG. 13 is a diagram showing a watermark extracting process according to an embodiment of the present invention.

FIG. 13 is a diagram showing a watermark extracting process according to an embodiment of the present invention.

A receiver 1320 such as a general digital TV receiver receives an A/V signal from a cable or satellite set-top box 1310 mounted in the receiver 1320 through an HDMI or component connection. Hereinafter, according to the embodiment of the present invention shown in FIG. 13, operation for extracting a watermark and recognizing a CP will be described in stages in the set-top box 1310 and the receiver 1320.

If an input mode of the receiver 1320 is set to an external input mode, the receiver 1320 may search for a CP ID for identifying a content provider or a broadcaster. If the set-top box 1310 is turned on and a channel is tuned to, the receiver 1302 may detect a CP ID. The receiver 1302 may detect a content ID and time information of content provided by the detected content provider. If the channel of the service received from the set-top box 1310 is changed, the receiver 1320 may newly search for a CP ID for identifying a content provider according to the changed channel.

Figure 14:
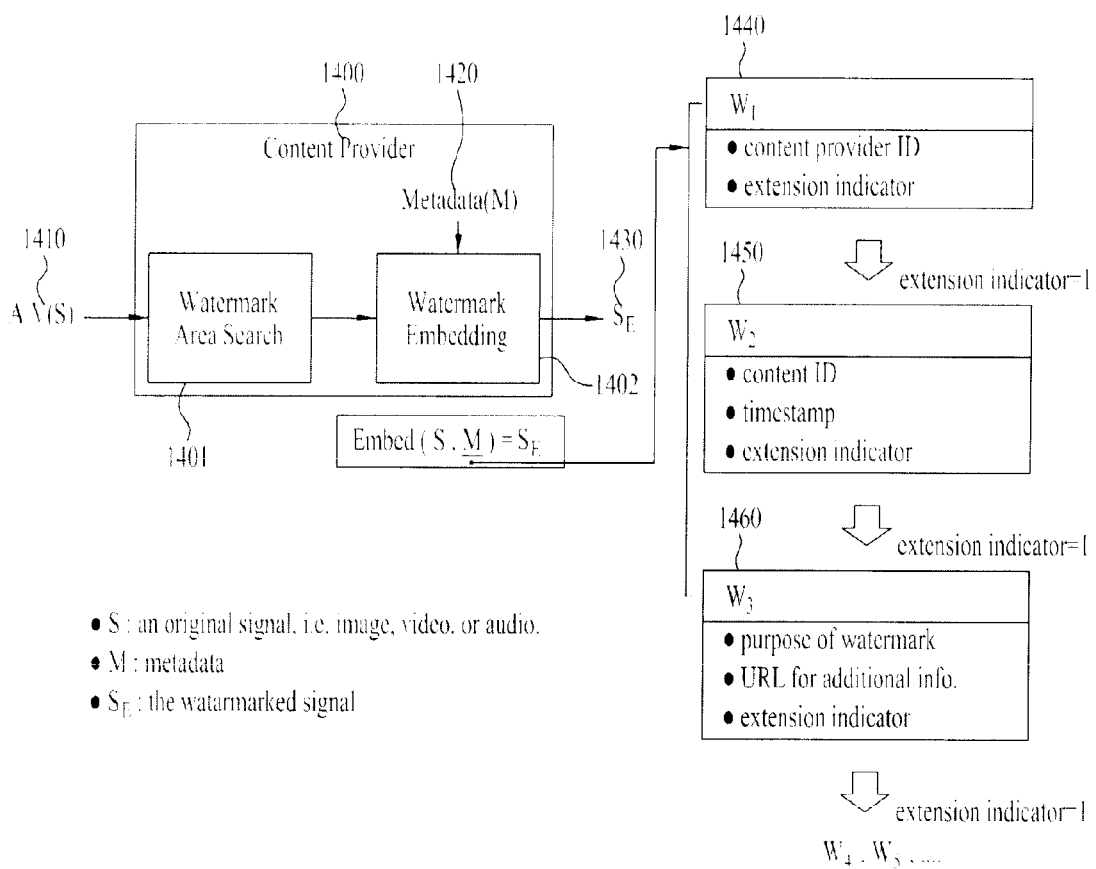
FIG. 14 is a diagram showing profiling of watermark information according to an embodiment of the present invention.

FIG. 14 is a diagram showing profiling of watermark information according to an embodiment of the present invention.

As described with reference to FIGS. 12 and 13, the receiver according to one embodiment of the present invention may recognize a CP using a watermark for transmitting CP information included in A/V content. In this case, if the amount of information stored in the watermark is increased, quality of A/V content into which the watermark is inserted may be deteriorated. Accordingly, in the present invention, in order to solve such a problem, a method of profiling and leveling a watermark according to attributes of information stored in the watermark and inserting the leveled watermark into A/V content is proposed. In this case, since the leveled watermark is differentiated according to attributes of the stored information and is inserted into the A/V content, the amount of information about the inserted watermark may be adjusted to prevent the quality of content from being deteriorated.

Accordingly, in the present invention, in order to level a watermark according to profiling, the watermark may be divided into a basic profile watermark and an extended profile watermark according to attributes of information stored in the watermark. The basic profile watermark may include information essentially necessary to recognize a real-time broadcast program in order to perform an ACR function. The extended profile watermark may include additional information instead of information essentially necessary to perform an ACR function. A plurality of extended profile watermarks may be present and may be leveled again according to attributes of information. In this case, the basic profile watermark and the extended profile watermark may be inserted into A/V content according to different cycles.

FIG. 14 is a diagram showing a process of inserting a leveled watermark into A/V content as described above.

As described above, a content provider 1400 may receive an original signal 1410 such as video/audio, search for a region into which a watermark will be inserted (1401) and embed, in a watermark, metadata 1420 related to content to be provided (1402). Thereafter, the content provider 1400 may transmit the watermarked signal 1430 to a receiver. In the watermarked signal 1430, the original signal 1410 and the metadata 1420 may be stored in the form of a watermark. In one embodiment, the watermark of FIG. 14 may include a basic profile watermark W1 1440 and first and second extended profile watermarks W2 and W3 1450 and 1460.

The basic profile watermark 1440 may include a content provider ID element and an extension indicator.

The content provider ID element may indicate information for identifying a broadcaster or a CP for providing content.

The extension indicator element may indicate whether a watermark of a next level, that is, a first extended profile watermark 1450, is additionally inserted. If the value of the extension indicator element is 1, this indicates that the first extended profile watermark 1450 of the next level is inserted.

The first extended profile watermark 1450 may include a content ID element, a timestamp element and an extension indicator element.

The content ID element may indicate serial number information for identifying a content name or content.

The timestamp element indicates time information of content.

The extension indicator element may indicate whether a watermark of a next level, that is, a second extended profile watermark 1460, is additionally inserted as described above. As shown in FIG. 14, the second extended profile watermark 1460 may include a watermark insertion usage element, a URL element of additional information and an extension indicator element.

The watermark insertion usage element may indicate information about watermark insertion usage.

The URL element of the additional information may indicate additional information or URL information for receiving a service.

The extension indicator element may indicate whether a watermark of a next level is inserted.

As shown in FIG. 14, a content provider or a broadcaster may differentiate the number of times of inserting the watermark into the A/V content according to watermark profiling when the leveled watermark is inserted into the A/V content.

For example, since the basic profile watermark 1440 includes important basic information of a broadcast program, the content provider or the broadcaster may set the number of times of inserting the basic profile watermark such that the receiver accurately recognizes information as soon as possible.

That is, the content provider or the broadcaster may insert basic profile watermarks 1440 more than extended profile watermarks 1450 and 1460 during a transmission cycle of the watermarked signal 1430. Accordingly, the receiver may preferentially extract the basic profile watermark 1440 and then extract the extended profile watermarks 1450 and 1460 as necessary. In this case, the receiver may check presence of the extended profile watermark according to the value of the extension indicator element and extract the extended profile watermark. That is, the receiver may discriminatorily extract watermarks discriminatorily inserted according to the profile of the watermark and efficiently store and manage information included in the watermark.

Up to now, a method and system for providing an ACR service using watermarking according to an embodiment of the present invention has been described. Hereinafter, a method of embedding a watermark in content at a content provider and a method of extracting a watermark from content at a receiver according to an embodiment of the present invention will be described in detail.

A method of embedding a watermark in a video frame at a content provider and a method of extracting a watermark from content at a receiver will be described with reference to FIGS. 15 to 17 and a method of embedding a watermark in an audio frame at a content provider and a method of extracting a watermark from content at a receiver will be described with reference to FIG. 18.

Figure 15:
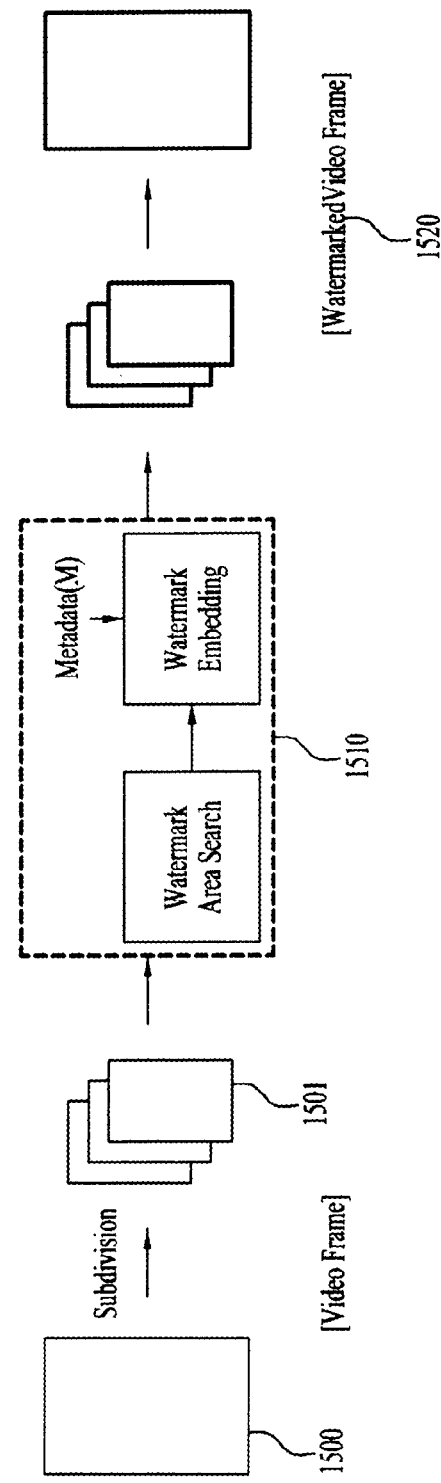
FIG. 15 is a diagram showing a method of embedding a watermark in a video frame according to an embodiment of the present invention.

FIG. 15 is a diagram showing a method of embedding a watermark in a video frame according to an embodiment of the present invention.

A content provider first subdivides one video frame 1500 into subframes 1501, searches for the subdivided subframes 1502, and determines an area in which a watermark will be appropriately embedded. If a subframe area in which a watermark will be embedded is determined, the watermark is embedded in the subframe area (1510) and the subframes are combined to regenerate one video frame (1520).

In order to extract the watermark from the video frame embedded in the overall area of one video frame at the receiver, first, the receiver subdivides one video frame into subframes. An area in which the watermark may be embedded is detected from the subdivided subframes. The watermark is extracted from the detected subframe area and the extracted watermarks are compared to finally determine one watermark. Enhancement data may be downloaded using content information through the determined watermark.

Figure 16:
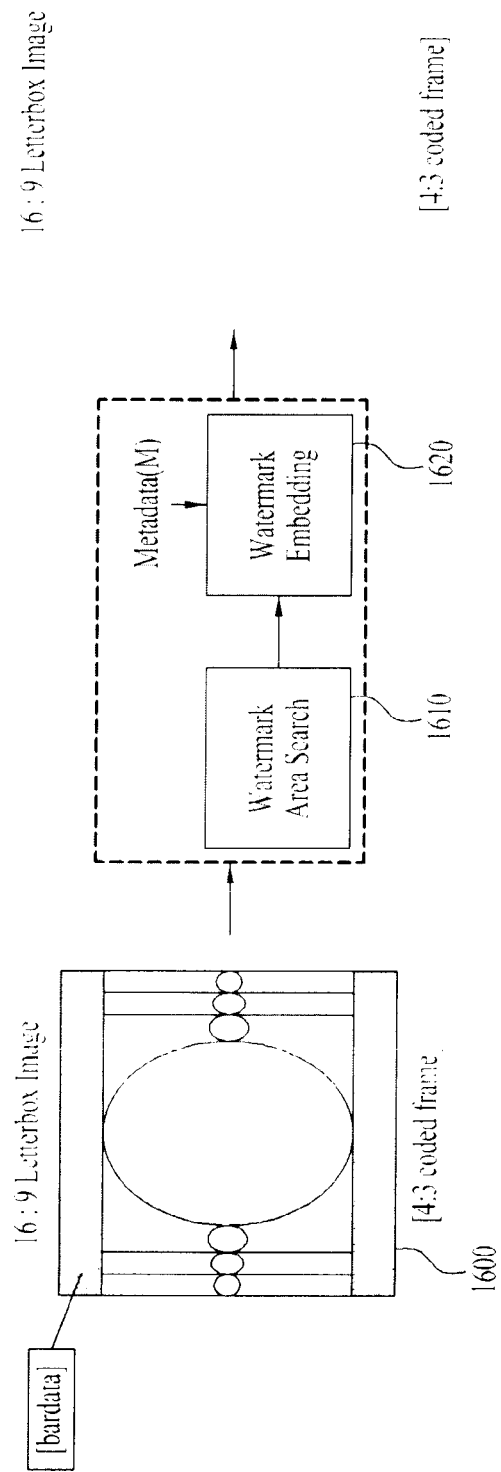
FIG. 16 is a diagram showing a method of embedding a watermark in a video frame according to another embodiment of the present invention.

FIG. 16 is a diagram showing a method of embedding a watermark in a video frame according to another embodiment of the present invention.

More specifically, FIG. 16 shows a method of embedding a watermark in a bar data area of a video frame according to an embodiment of the present invention.

If a watermark is embedded in the overall area of one video frame, watermarking robustness may be improved but processing necessary to extract the watermark at the receiver may be increased. Therefore, by embedding the watermark in some areas of the video frame, it is possible to decrease processing necessary to extract the watermark at the receiver so as to improve operation efficiency of the receiver. Some areas, in which the watermark will be embedded, of the overall area of the video frame may be predefined according to the rules of the transmitter/receiver. Hereinafter, according to the embodiment of the present invention, the content provider may embed the watermark in the bar data area which is a part of the overall area of the video frame.

When the content provider transmits content to the receiver, if an image ratio of content mismatches a transmission format, a bar data area 1600 may be generated on a screen. For example, as shown in FIG. 16, in case of converting a video frame having an aspect ratio of 16:9 into an aspect ratio of 4:3, black bands may be generated in upper and lower edges of a screen having the aspect ratio of 4:3 so as not to crop the left and right edges of the screen. The area of the black band may be the bar data area 1600 which is called a letterbox.

As shown in FIG. 16, in case of a video frame in which the bar data area 1600 is present, the watermark may be embedded in the bar data area 1600 to be transmitted. The method of embedding the watermark in the bar data area may be performed equally to the process of embedding the watermark in the video frame described with reference to FIG. 15.

More specifically, the content provider may search for the bar data area 1600 of the video frame, in which the watermark will be embedded, (1600) and embed the watermark in the bar data area 1600 (1620).

In order to extract the watermark embedded in some areas of the video frame, first, the receiver subdivides one video frame into subframes. An area in which the watermark may be embedded is detected from the subdivided subframes. According to the embodiment of the present invention shown in FIG. 16, the receiver may detect the bar data area from the subdivided subframes. The watermark is extracted from the detected subframe area and the extracted watermarks are compared to finally determine one watermark. Enhancement data may be downloaded using content information through the determined watermark.

Figure 17:
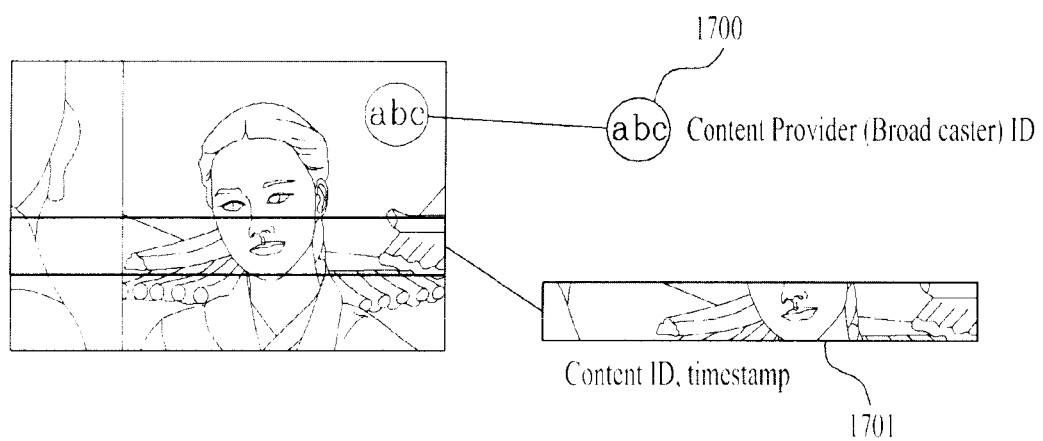
FIG. 17 is a diagram showing a method of embedding a watermark in a video frame according to another embodiment of the present invention.

FIG. 17 is a diagram showing a method of embedding a watermark in a video frame according to another embodiment of the present invention.

More specifically, FIG. 17 shows a method of embedding a plurality of watermarks including different content information (or metadata) into different areas of one video frame.

For example, as shown in FIG. 17, a watermark including CP ID information may be embedded in a logo area 1700 located at a right upper side of a screen and a watermark including a content ID and timestamp information may be embedded in a central area 1701 of the same screen.

A method of embedding the plurality of watermarks including different content information into one video frame may be largely divided into two methods according to the embodiment of the present invention.

A plurality of different watermarks may be embedded in different areas 1700 and 1701 of a video frame. At this time, the two or more areas 1700 and 1701 of the video frame, in which the watermark will be embedded, may be predefined according to the rules of the transmitter/receiver.

Alternatively, a separate watermark including information about the different areas 1700 and 1701 of the video frame may be first embedded. Different areas 1700 and 1701, in which the watermarks including content information will be embedded, may be detected through a separate watermark and the watermarks may be respectively embedded in the areas 1700 and 1701. The separate watermark may be embedded in a specific area or a logo part of the video frame and may be predefined according to the rules of the transmitter/receiver.

If the received video frame includes watermarks having different content information according to areas, first, the receiver acquires information about the area, in which the watermark is embedded, through another path or according to the rules of the transmitter/receiver. Using the acquired information, the watermark is extracted from each area of the video frame. According to the embodiment of the present invention shown in FIG. 17, the watermark including information about a content provider may be extracted from the logo area 1700 and the watermark including a content ID and time information may be extracted from the central area 1701 of the screen. Alternatively, if information for extracting different watermarks from the extracted watermarks (e.g., information about an area in which the watermark is embedded) is included, it is possible to extract the different watermarks using the information.

Figure 18:
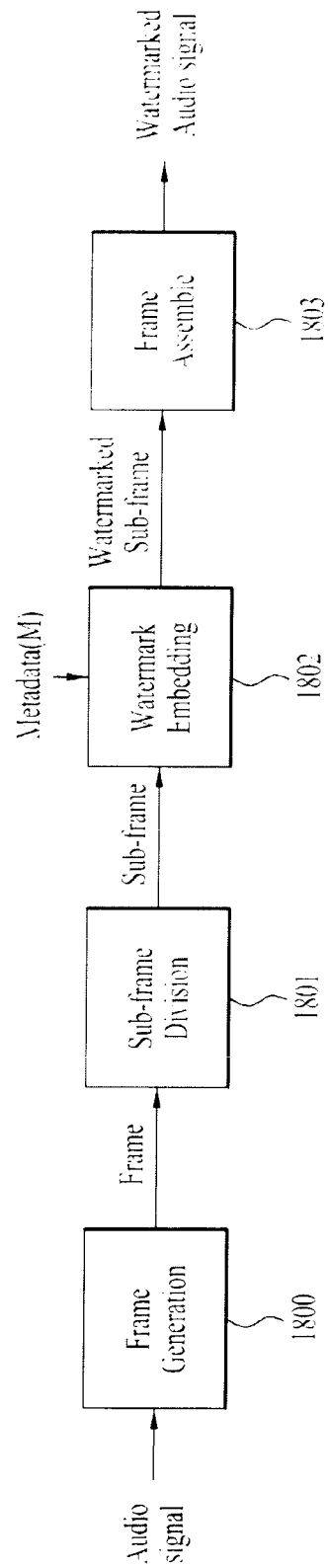
FIG. 18 is a diagram showing a method of embedding a watermark in an audio frame according to an embodiment of the present invention.

FIG. 18 is a diagram showing a method of embedding a watermark in an audio frame according to an embodiment of the present invention.

More specifically, FIG. 18 shows a process of embedding one watermark in an audio frame.

An original audio signal is divided into frames having a constant length (1800) and the divided audio frame is subdivided into subframes (1801). Using the subdivided subframes, an area in which a watermark will be embedded may be searched for (1802). For example, a frequency band higher than 4 kHz to which a human ear is sensitive may be searched for and determined as a watermark embedding area. The watermark is embedded in the searched area (1803) and the subframes are recombined into one audio signal (1803).

In addition, according to the embodiment of the present invention, a plurality of watermarks may be embedded in an audio signal based on the watermark embedding process shown in FIG. 18. The embedding method may include a method of respectively embedding watermarks to two or more different frequency bands and recombining the subframes into one audio signal and a method of embedding one watermark in continuous audio frames and embedding the other watermarks to different frequency bands.

According to the above-described embodiment of the present invention, if the audio signal in which the watermark is embedded is received, the receiver may first divide the audio signal into frames having a constant length in order to extract the watermark from the audio signal. The divided frame may be subdivided into subframes and the watermark extraction area may be detected from the subframes. The watermark is extracted from the detected area. If a plurality of watermarks is embedded in an audio signal, the watermarks may be extracted from the received audio signal at two or more frequency bands defined according to the rules of the transmitter/receiver. Alternatively, one watermark may be extracted from continuous audio frames and the other watermarks may be extracted from the signals of different frequency bands defined according to the rules of the transmitter/receiver. In addition, according to the embodiment of the present invention of the method of embedding the watermark described with reference to FIGS. 15 to 18, the watermark may be embedded in both audio content and video content.

If a watermark including the same content information may be embedded in both video and audio frames, the same watermark may be repeatedly embedded in the video and audio frames with a predetermined periodicity. According to such a method, since the receiver may simultaneously extract the same watermark from the video and audio frames in which the watermark is embedded, it is possible to improve accuracy of a result of extracting the watermark and to reduce a time consumed to finally acquire an accurate result.

Alternatively, watermarks may be divided according to content information included in the watermark and the divided watermarks may be embedded in video and audio frames. For example, the content information included in the watermark is divided into essential information for recognizing a broadcast program, such as a CP ID and a content ID, and additional information. The essential information may be embedded in a video frame and additional information may be embedded in an audio frame. On the contrary, the essential information may be embedded in an audio frame and additional information may be embedded in a video frame. Since the amount of information embedded in one video or audio frame is restricted, if the watermark is embedded using such a method, it is possible to increase the amount of metadata embedded during a predetermined time.

FIG. 19 is a diagram showing a method of embedding a profiled watermark according to an embodiment of the present invention.

As described with reference to FIG. 14, since the quality of A/V content may be deteriorated as the amount of content information stored in the watermark is increased, if the watermark is leveled according to type of information stored in the watermark, it is possible to efficiently utilize the watermark while maintaining the quality of content.

According to the embodiment of the present invention, after the watermark is profiled according to attributes of information stored in the watermark, the number of times of embedding the watermark in a content frame during a predetermined cycle may be differently set.

For example, information stored in the watermark may be divided into essential information for recognizing a broadcast program and additional information or information having a short change cycle and information having a long change cycle. The number of embedding the watermark including essential information and/or information having a short change cycle in the frame during a predetermined cycle may be increased and the number of embedding the watermark including additional information and/or information having a long change cycle in the frame during a predetermined cycle may be decreased.

More specifically, as shown in FIG. 19, a watermark including information necessary to recognize a program such as a CP ID and a content ID may be embedded in a logo area 1900 and a watermark including additional information such as URL information may be embedded in another specific area 1901 of the frame. In this case, the watermark of the logo area 1900 is data necessary to recognize the program and thus may be embedded in all video frames 1910, 1920 and 1930 and the watermark of the specific area 1901 of the frame for providing the additional information may be embedded in the two frames 1910 and 1930 once.

Figure 20:
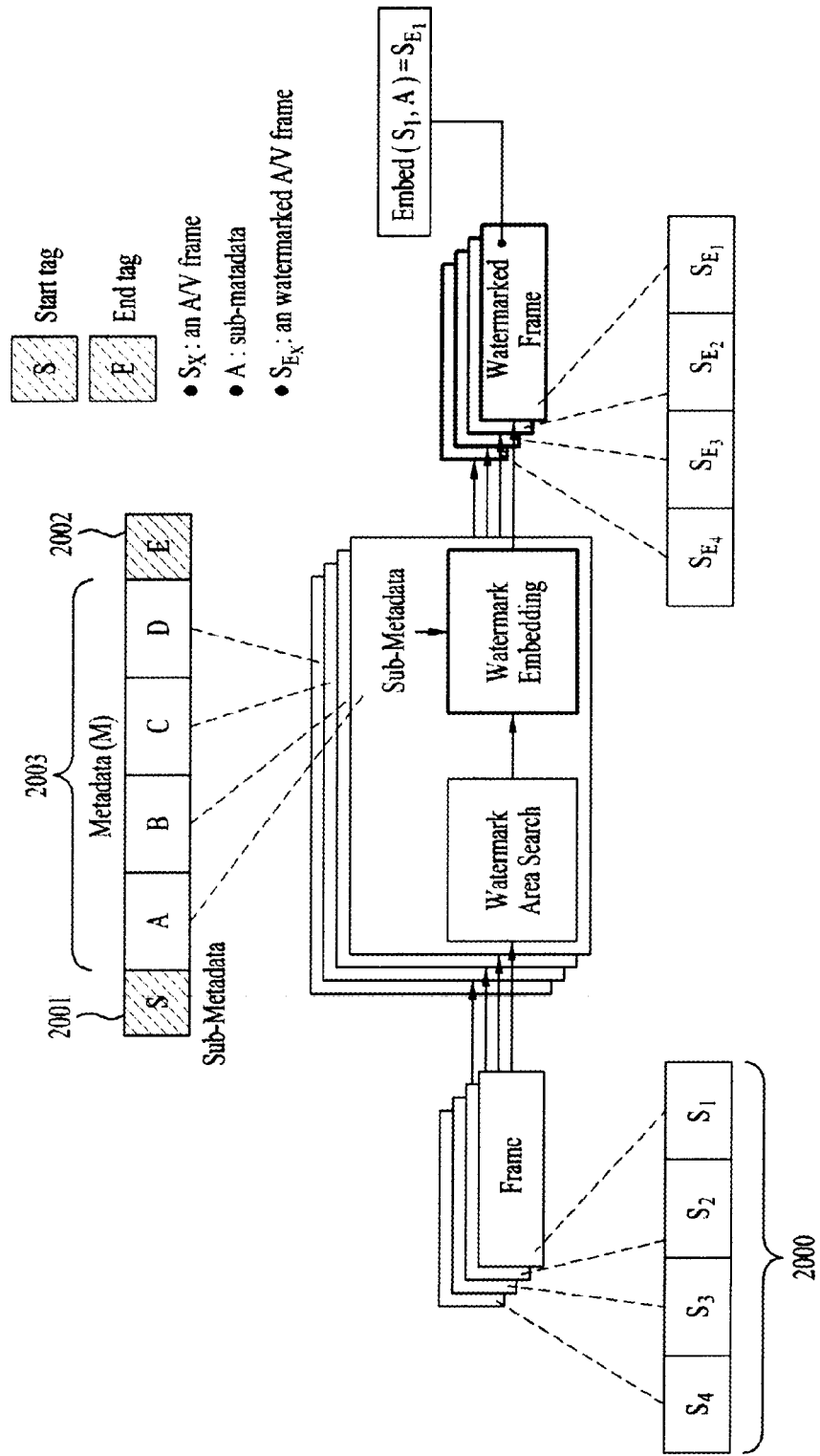
FIG. 20 is a diagram showing a method of embedding watermarks in continuous frames according to an embodiment of the present invention.
Figure 21:
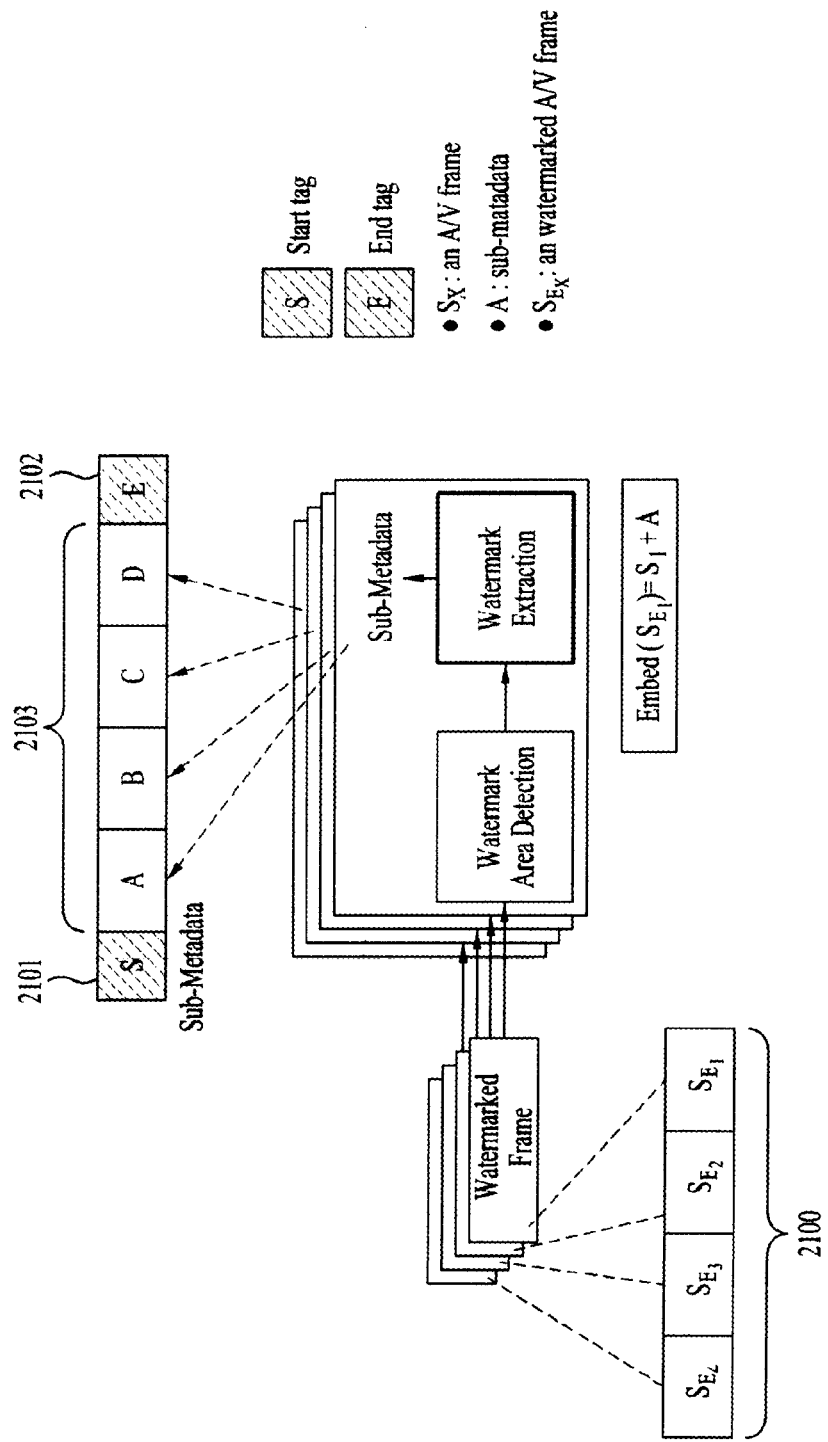
FIG. 21 is a diagram showing a method of extracting watermarks inserted into continuous frames according to an embodiment of the present invention.

FIGS. 20 and 21 show a method of embedding and extracting a watermark according to an embodiment of the present invention.

FIG. 20 is a diagram showing a method of embedding watermarks in continuous frames according to an embodiment of the present invention.

FIG. 21 is a diagram showing a method of extracting watermarks inserted into continuous frames according to an embodiment of the present invention.

The amount of content information which may be embedded in one A/V frame is restricted. According to the embodiment of the present invention shown in FIGS. 20 and 21, the watermark may include a large amount of content information.

As shown in FIG. 20, the content provider may embed the watermark including content information into continuous frames. In order to indicate the start and end of the content information, after a start tag 2001 indicating start information of content information and an end tag 2002 are embedded in content information, the content information is divided into sub content information 2003. The watermarks including the sub content information 2003 may be embedded in continuous A/V frames 200, respectively. In addition, if the watermarks are repeatedly embedded in the continuous A/V frames 2000 during a predetermined cycle, the receiver may efficiently extract the watermarks.

As shown in FIG. 21, the receiver may extract the watermarks from the continuous frames in which the watermarks are embedded. First, the receiver extracts the watermarks embedded in the continuous A/V frames. A start tag 2101 and an end tag 2102 of content information may be detected from the extracted watermarks. If the start information of the content information is acquired from the start tag 2101, the watermarks are extracted from the A/V frames received after the start tag 2101 has been detected so as to acquire sub content information 2103, and the acquired sub content information 2103 is combined. If the end information of the content information is acquired from the end tag 2102, the process of combining the sub content information 2103 is finished to acquire one piece of content information.

Figure 22:
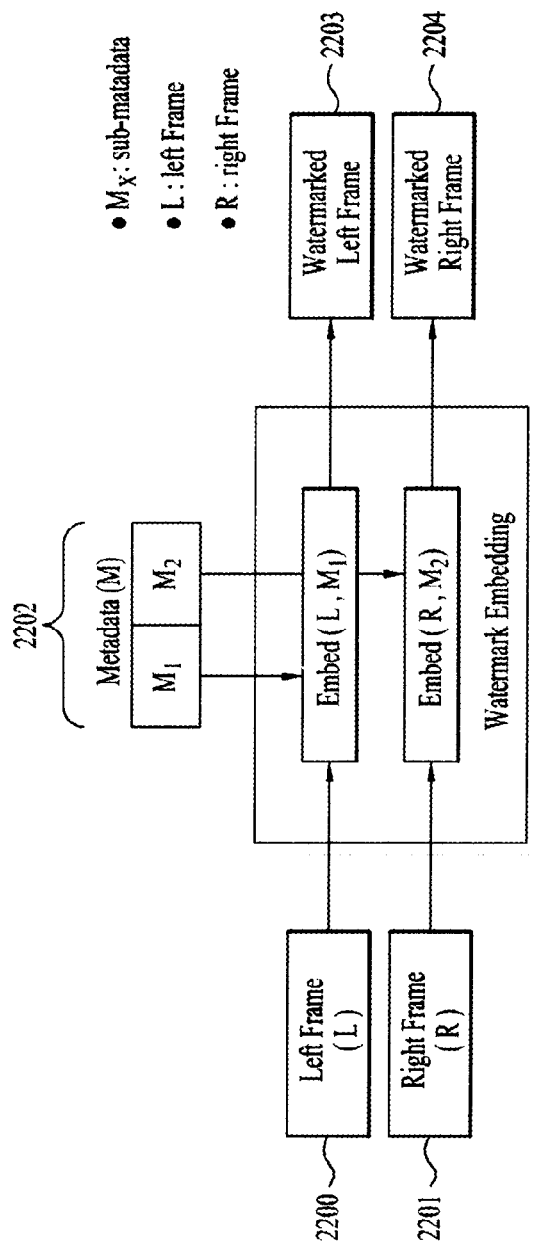
FIG. 22 is a diagram showing a method of embedding a watermark in a 3D video frame according to an embodiment of the present invention.

FIG. 22 is a diagram showing a method of embedding a watermark in a 3D video frame according to an embodiment of the present invention.

A full 3D video image may be implemented by acquiring a left image and a right image using two cameras, enabling a left eye to view the left image and enabling a right eye to view the right image. In the present invention, a method of embedding and extracting a watermark in and from a 3D video frame is proposed.

As shown in FIG. 22, the 3D video frame may include a left frame 2200 and a right frame 2201. A content provider may embed content information (or metadata) 2202 into the left frame 220 and the right frame 2201 and generate a left frame, in which the watermark is embedded, (hereinafter, referred to as a watermarked left frame) 2203 and a right frame, in which the watermark is embedded, (hereinafter, referred to as a watermarked right frame) 2204.

A standard definition (SD) or high definition (HD) image may be generated and transmitted.

First, the content provider may embed the watermark in only the left frame 2200 or the right frame 2201 and transmit the watermarked left and right frames to the receiver. The receiver may extract the watermark from one of the watermarked left frame 2203 or the watermarked right frame 2204. In this case, as described with reference to FIGS. 15 to 17, the method of embedding the watermark in the video frame and the method of extracting the watermark from the video frame may be applied. The watermarked video frame may be predefined according to the rules of the transmitter/receiver.

Second, the content provider may embed the watermark including the same content information into the left frame 2200 or the right frame 2201 and transmit the watermarked left and right frames to the receiver. The receiver may extract the watermark from each of the watermarked left frame 2203 or the watermarked right frame 2204. The extracted watermarks may be compared and corrected if the watermarks are identical or if a difference between the watermarks is within an allowed error range. In this case, the methods described with reference to FIGS. 15 to 17 are applicable to the method of inserting the watermark into the left frame 2200 or the right frame 2201 and the method of extracting the embedded mark. The watermark may be embedded in the left frame 2200 or the right frame 2201 using the same method or different methods. Although such a method may increase complexity when the receiver extracts the watermark, watermark extraction robustness may be increased.

Third, the content provider may embed different watermarks in the left frame 2200 or the right frame 2201 and transmit the watermarked left and right frames to the receiver. The receiver may extract the watermark from each of the watermarked left frame 2203 or the watermarked right frame 2204. The extracted watermark may include one piece of content information. Alternatively, content information included in the extracted watermark may be combined to generate one piece of new content information. In the latter case, content information greater in amount than the amount of content information transmittable via one video frame may be embedded in the video frame. Alternatively, content information which may be included in one video frame may be divided and embedded in the left frame 2200 or the right frame 2201. In this case, it is possible to reduce a possibility that the quality of image is deteriorated.

Figure 23:
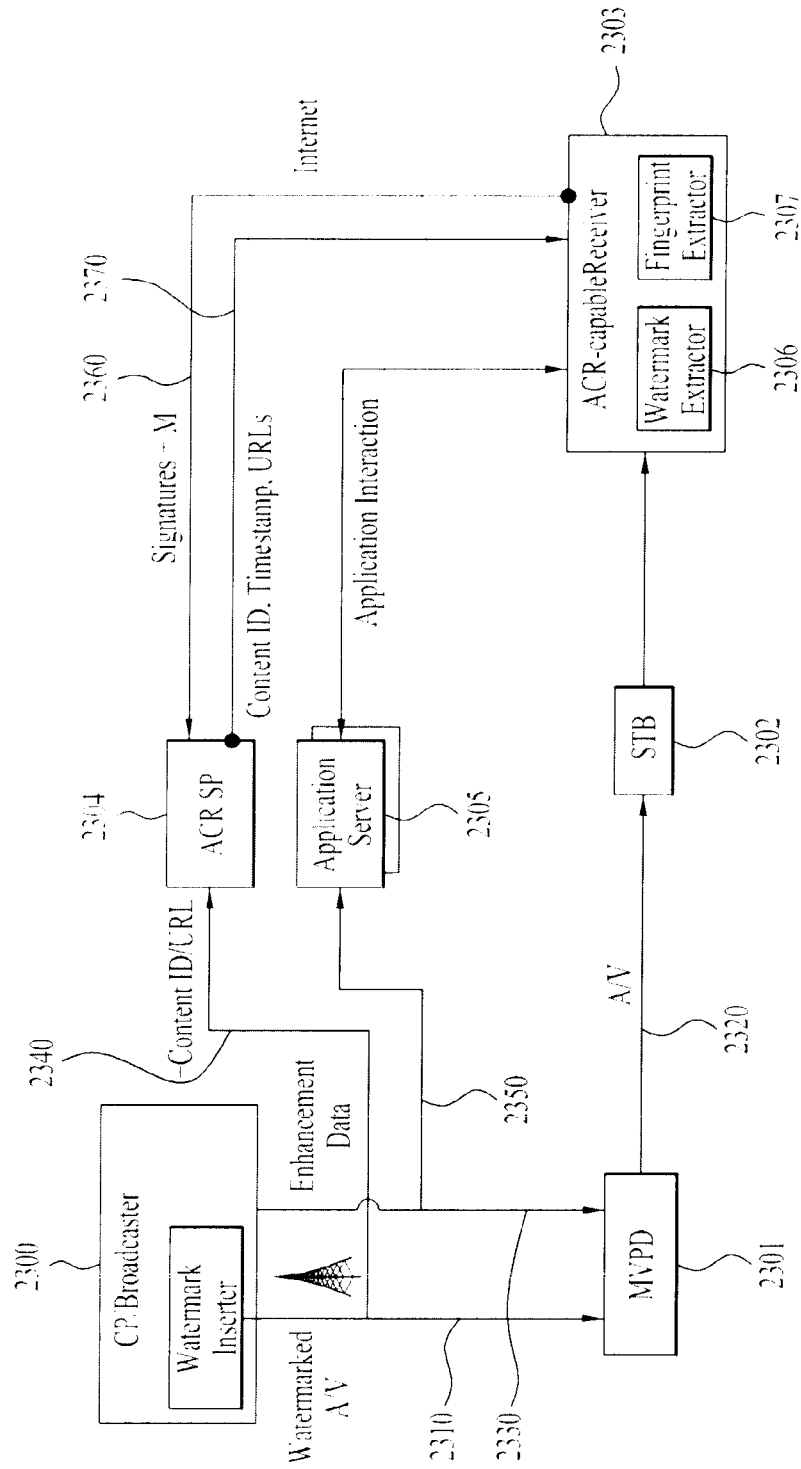
FIG. 23 is a diagram showing the structure of an ACR service provision system according to an embodiment of the present invention.

FIG. 23 is a diagram showing the structure of an ACR service provision system according to an embodiment of the present invention.

More specially, FIG. 23 shows an ACR service provision system for recognizing broadcast content using both watermarking and fingerprinting technologies according to one embodiment of the present invention.

In watermarking, a recognition ratio of content embedded in one frame is high but the quality of content may be deteriorated if a large amount of content information is embedded in a watermark. That is, the amount of embedded metadata is restricted.

In fingerprinting, the quality of content is not influenced but an ACR server for recognizing content is necessary. In addition, a time consumed to recognize content and a content recognition result depends on the size of a reference set.

According to the embodiment of the present invention shown in FIG. 23, if broadcast content is recognized by a combination of watermarking and fingerprinting technologies, it is possible to efficiently provide an ACR service while solving the problems of the two technologies.

The present invention includes a method of recognizing a broadcast program which is currently being viewed using two technologies. Metadata, which is used to recognize a program such as an identifier of a content provider or a broadcaster and needs to be most accurately recognized, may be embedded in broadcast A/V content and may be transmitted.

Hereinafter, a mechanism between components of an ACR service provision system shown in FIG. 23 will be described in detail.

If the content provider 2300 transmits watermarked A/V content and enhancement data to an MVPD 2301 (2310, 2330), the receiver 2303 may receive the A/V content through a set-top box 2302 but may not receive the enhancement data (2320). Accordingly, in order to enable the receiver 2303 to receive the enhancement data through another path, the content provider 2300 may transmit additional information of the A/V content to an ACR server 2304 (2340) and transmit the enhancement data to an application server 2305 (s250). The additional information of the A/V content may be information for delivering the enhancement data related to the A/V content to the receiver 2303 and may include a content ID, a timestamp, a URL, etc.

A watermark extractor 2306 of the receiver 2303 may extract a watermark from the received A/V content and, at the same time, a fingerprint extractor 2307 may extract a fingerprint signature from the A/V content. The receiver 2303 may transmit a query including the content information included in the watermark and the fingerprint signature to an ACR server 2304 (2360) and acquire the additional information of the A/V content from the ACR server 2304 (2360). Then, the receiver 2303 may receive the enhancement data from the application server 2305 using the additional information of the A/V content (2380). By including the watermarking result in the query, it is possible to reduce a time consumed to recognize the content at the ACR server and to improve content recognition accuracy of the ACR server.

Figure 24:
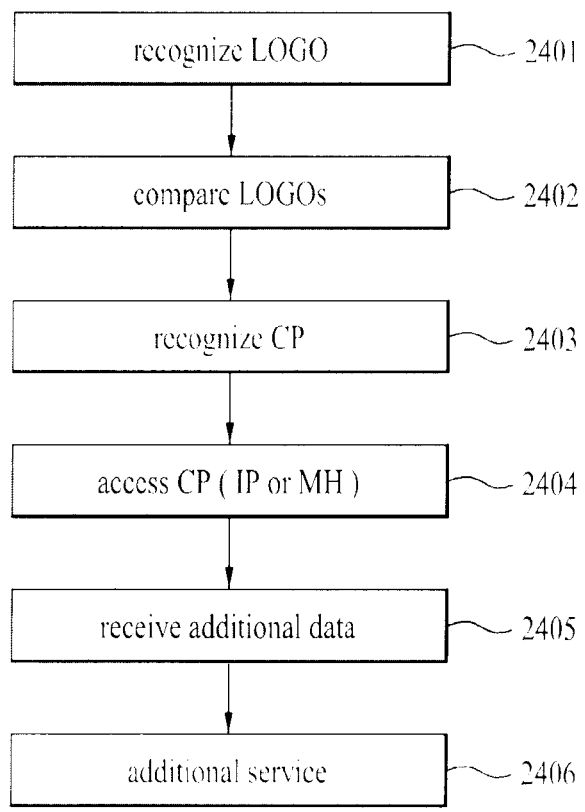
FIG. 24 is a diagram showing a method of providing an ACR service using a broadcaster a logo according to an embodiment of the present invention.

FIG. 24 is a diagram showing a method of providing an ACR service using a broadcaster a logo according to an embodiment of the present invention.

FIG. 25 is a diagram showing a broadcaster logo according to an embodiment of the present invention.

Figure 26:
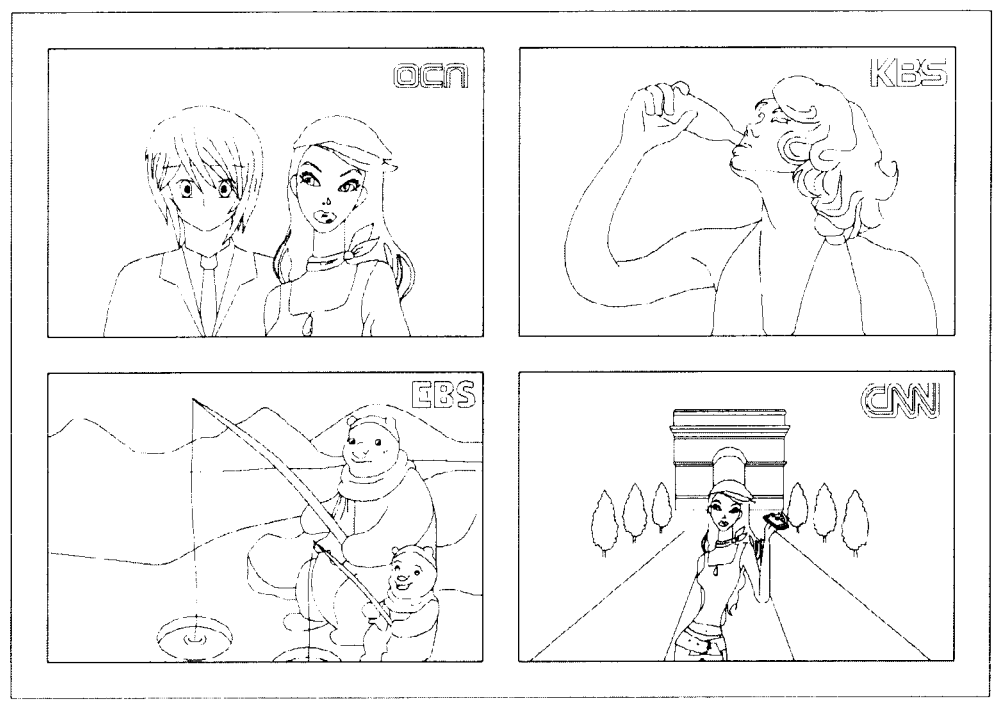
FIG. 26 is a diagram showing an ACR service using a broadcaster logo according to an embodiment of the present invention.

FIG. 26 is a diagram showing an ACR service using a broadcaster logo according to an embodiment of the present invention.

A content provider (or a broadcaster) has a logo indicating content thereof. For example, content providers may have logos shown in FIG. 25. The broadcaster or the content provider may insert a logo into a right upper side, a left upper side, a right lower side or a left lower side of a screen as shown in FIG. 26 so as to display content. Even when a video scene displayed on the screen is changed, the logo is not changed and is continuously displayed. In the present invention, an ACR service method of automatically recognizing information continuously displayed in a specific part of a screen using the property of a logo is proposed.

As shown in FIG. 24, according to the embodiment of the present invention, a watermark may be inserted into a logo to provide an ACR service. A receiver may recognize the logo to acquire content provider information indicating the logo and access the content provider to receive a service, thereby providing an ACR service. Hereinafter, a method of providing an ACR service using a logo will be described in detail.

First, the receiver may acquire logo information through a logo recognition step 2401 and a logo comparison step 2402. The receiver may acquire content provider information as a comparison result to recognize the content provider (2403) and access the content provider server (2404). Additional information of the content may be received from the content provider server (2405) to provide an additional server (2406).

The logo recognition step 2401 and the logo comparison step 2402 of the receiver may be performed by comparing the logo recognized by the receiver and the logos of the content providers pre-stored in the receiver.

Information about the stored logos is information received and stored by the receiver through an IP network or MH or default information stored in the receiver. New version information of the logo may be maintained. In case of information received via the IP network or MH, new logo information may be maintained by continuously receiving logo information through the IP network or MH and, in case of the default information, new logo information may be maintained through continuous update.

In the logo comparison step 2402, if the recognized logo is compared with all logo information stored in the receiver, the amount of information is large. Thus, a burden is imposed on the receiver. According to the embodiment of the present invention, since extraction, storage and comparison may be performed based on the detailed properties of the logo, it is possible to overcome such a restriction. For example, logo properties such as logo color, letter (SBS, CNN, etc.) and contour may be recognized to perform comparison. If a contour is used, a space in which the logo is displayed may be divided by coordinates to recognize the logo using the coordinate properties.

Figure 27:
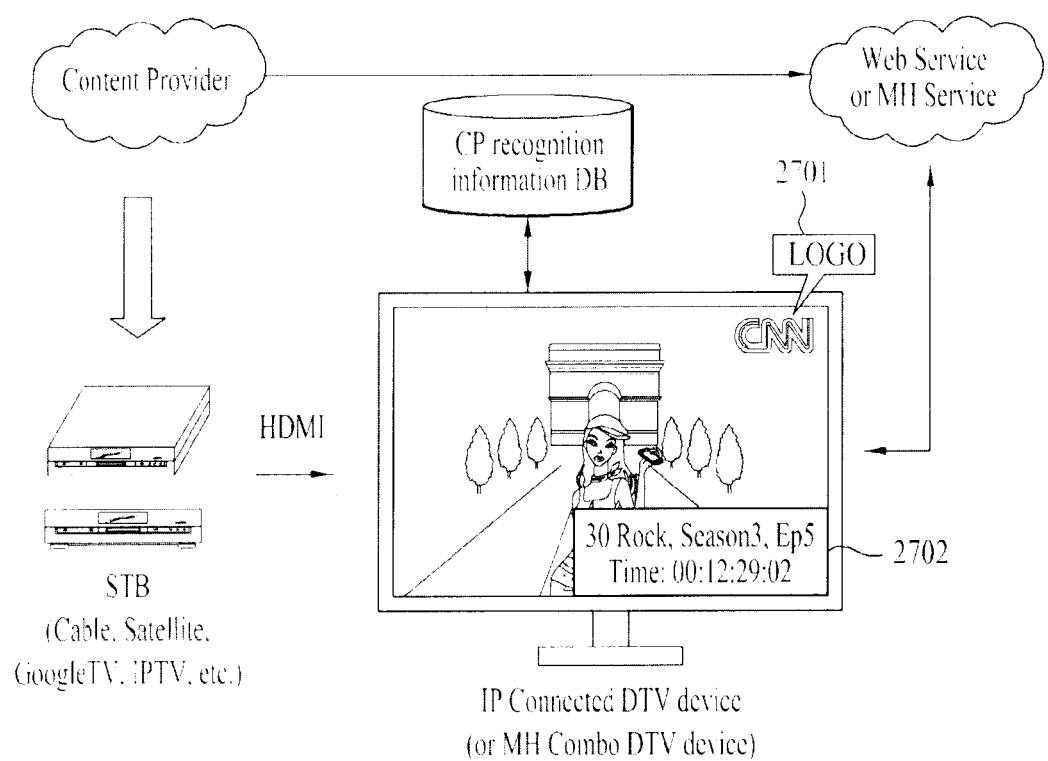
FIG. 27 is a diagram showing an ACR service provision method using a logo and a watermark according to an embodiment of the present invention.

FIG. 27 is a diagram showing an ACR service provision method using a logo and a watermark according to an embodiment of the present invention.

As shown in FIG. 27, in an ACR service, a receiver may extract logo information 2701 or a watermark 2702 to acquire information about a content provider and receive an additional service provided by a content provider through an IP network or MH.

As described above, if a watermark is embedded in content, the data of the content may be changed. Accordingly, in the present invention, a method of embedding a watermark in a logo area included in content is proposed.

Hereinafter, a method of utilizing logo information and a watermark at a receiver for an ACR service according to the embodiment of the present invention shown in FIG. 25 will be described in detail.

As described above, the receiver according to the embodiment of the present invention may extract and utilize a watermark including a predetermined amount of content information by a specific algorithm inserted into a specific field of A/V frame data when content is played back. For example, the receiver which receives video content including 30 frames per second may extract, from M frames, a watermark including data of N bits corresponding to a specific field or a specific location in each frame. In this case, the total amount of extracted watermark data may become N*M bits. If the number of watermarked frames is increased, the amount of watermark data to be extracted is increased. Therefore, a time consumed to extract the watermark at the receiver may be increased and the quality of the A/V content processed by the receiver may be deteriorated.

Accordingly, in the present invention, a method of embedding a watermark in a logo area included in a video frame is proposed. The logo area is included in all video frames and may be displayed at the same location on a screen even when a playback screen is changed. Accordingly, even when the amount of data is large, if a watermark is embedded in a logo area, it is possible to reduce a time consumed to extract a watermark and to decrease a possibility that the quality of A/V content is deteriorated.

Hereinafter, a method of embedding a watermark in a logo according to one embodiment of the present invention will be described. The method of embedding the watermark in the logo according to the embodiment of the present invention may include a method of embedding bar code data at a predetermined location of a logo, a method of utilizing a metadata packet of logo information as a watermark and a method of embedding a watermark in a part of image data of a logo.

In case of the method of embedding the bar code data at the predetermined location of the logo, the receiver may recognize the bar code data located at a specific location as a watermark. In this case, the bar code data is not displayed.

In the method of utilizing the metadata packet of the logo information as the watermark, the metadata packet describing the logo is used as the watermark while the original form of image data of the logo is maintained. In this case, the metadata packet may include a CP ID, a content ID, time information, etc.

In the method of embedding the watermark in the logo information, N logo frames are combined using bits of the part of the image data of the logo and N watermark bits are embedded in the logo image data. In this case, content information or metadata included in the watermark is as described above.

Figure 28:
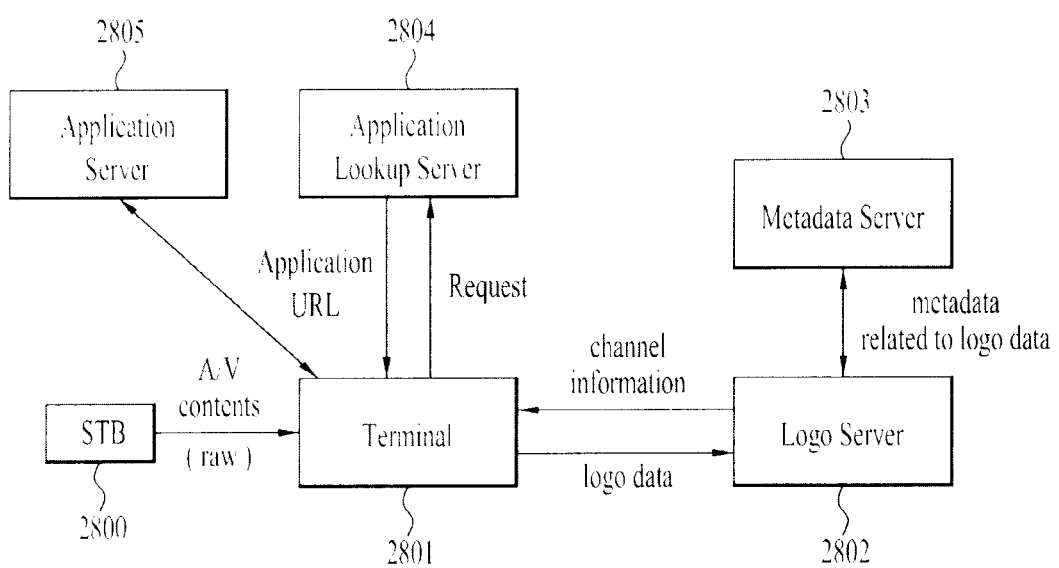
FIG. 28 is a diagram showing an ACR service processing system according to another embodiment of the present invention.

FIG. 28 is a diagram showing an ACR service processing system according to another embodiment of the present invention.

FIG. 28 is a diagram showing a system using a method of extracting logo data from video content, recognizing the logo data and recognizing information about a content provider indicated by the logo data, unlike FIG. 27, as a system for processing an ACR service using a logo and a watermark. The ACR service processing system of FIG. 28 may include a set top box (STB) 2800, a terminal 2801, a logo server 2802, a metadata server 2803, an application lookup server 2804 and/or an application server 2805. A receiver according to one embodiment of the present invention may include the STB 2800, the terminal 2801 and the logo server 2802 or may include at least one of the metadata server 2803, the application lookup server 2804 and the application server 2805, which may be changed according to designer's intention.

As shown in FIG. 28, an ACR service provision apparatus using the logo and the watermark may include a set top box (STB) 2800, a terminal 2801, a logo server 2802, a metadata server 2803, an application lookup server 2804 and/or an application server 2805. Here, the logo server 2802, the metadata server 2803, the application lookup server 2804 and/or the application server 2805 may be incorporated in the terminal as internal components or may be provided independent of the terminal.

An ACR service reception apparatus (receiver) according to one embodiment of the present invention may include the STB 2800, the terminal 2801 and the logo server 2802 or may include at least one of the metadata server 2803, the application lookup server 2804 and the application server 2805, which may be changed according to designer's intention.

More specifically, FIG. 28 shows a relationship between components of the receiver for receiving additional data (or enhancement data) related to broadcast content using logo data and a watermark if a receiver according to an embodiment of the present invention receives the broadcast content through the STB 2800. The logo data indicates a content provider and corresponds to a logo image such as a broadcaster emblem displayed in a specific area of content. Hereinafter, the components shown in FIG. 28 will be described.

The terminal 2801 may recognize and extract logo data from a video frame of raw data of the broadcast content received through the STB 2800. The logo data according to one embodiment of the present invention corresponds to a logo image displayed in a specific area of content. The terminal 2801 may transmit the extracted logo data and a channel information search signal to the logo server 2802 and receive channel information of a channel, via which the content is transmitted, from the logo server 2802. The channel information search signal according to one embodiment of the present invention may be generated based on the extracted logo data and may be request syntax. In addition, the channel information according to one embodiment of the present invention may include information indicating a content provider indicated by the logo data. In addition, the terminal 2801 may extract a watermark from an audio frame of the broadcast content and obtain program information of the broadcast content. The program information according to the embodiment of the present invention may include content ID information and/or time information.

The terminal 2801 may generate a request for obtaining an URL address and/or an IP address using the obtained channel information and/or program information. The terminal 2801 may send the request to the application lookup server 2804 to obtain the URL address and/or the IP address and access the application server 2805 using the obtained URL address and/or IP address to receive additional data of the content.

The logo server 2802 may receive metadata related to the logo data from the metadata server 2803 and store and manage the metadata in a database (DB). The metadata may include channel information of content indicated by the logo data.

The logo server 2802 may receive the logo data and the channel information search signal from the terminal 2801 and search the DB for the channel information related to the received logo data.

The logo server 2802 according to the embodiment of the present invention may compare the received logo data with the logo data pre-stored in the DB and confirm a content provider indicated by the received logo data. More specifically, the logo server 2802 may determine whether the received logo data is equal to the logo data stored in the DB. The logo server 2802 according to one embodiment of the present invention may compare a logo image, logo image color, text and/or contour corresponding to the logo data and determine whether the logo image corresponding to the received logo data is equal to the logo image of the stored logo data, as described with reference to FIG. 24.

If the received logo data is equal to the logo data stored in the DB, a content provider indicated by the received logo data is equal to a content provider indicated by the logo data stored in the DB. Accordingly, the logo server 2802 may obtain metadata related to the logo data stored in the same DB as the received logo data from the DB. As described above, the metadata may include channel information.

The logo server 2802 may send the channel information of the metadata related to the logo data to the terminal 2801. If the channel information is not present in the DB of the logo server 2802, the logo server 2802 may receive the channel information from the metadata server 2803.

The metadata server 2803 may update the metadata related to the logo data. More specifically, the metadata server 2803 may add, update and/or delete metadata and periodically send the updated metadata to the DB of the logo server 2802 to update the DB of the logo server 2802. The metadata server 2803 may be managed by a content provider (a broadcaster or a third party) and the terminal 2801 may be managed by a manufacturer (a receiver manufacturer or a service delivery platform (SDP) server), which may be changed according to designer's intention.

The application lookup server 2804 may analyze the request received from the terminal 2801 and obtain channel information and/or program information included in the request. Through the analyzed result, the application lookup server 2804 may determine whether an application for content corresponding to the channel information and/or program information is present. If the application for the content is present, the application lookup server 2804 may send the URL address and/or IP address of the application server 2805 to the terminal 2801.

The application server 2805 may manage the application for the content and/or data regarding the application.

As described above, the terminal 2801 may generate a request using the logo data and the watermark and receive the URL address and/or IP address from the application lookup server through the generated request. Thereafter, the terminal 2801 may access the application server 2805 using the received URL address and/or IP address and download the application. The application server 2805 may manage the application downloaded by the receiver. Thereafter, the receiver may receive additional data of the content through the application.

If the receiver cannot access an audio signal and thus cannot extract the watermark inserted into an audio frame, the terminal 2801 according to the embodiment of the present invention may generate a request using only the logo data extracted from the video frame. More specifically, the terminal 2801 according to one embodiment of the present invention may send the request including the channel information obtained through the logo data to the application lookup server 2804. The request according to one embodiment of the present invention may use an HTTP protocol. The application lookup server 2804 may confirm time information of the received request using a data field value included in a header of HTTP. Thereafter, the application lookup server 2804 may search for the URL address and/or IP address of the application accessible by the terminal 2801 using the channel information and/or the time information and send the URL address and/or IP address to the receiver. Thereafter, the receiver may receive additional data through the URL address and/or IP address.

If the receiver cannot access an audio signal and thus cannot extract the watermark inserted into an audio frame, the terminal 2801 according to the embodiment of the present invention may generate a request using symbol data included in a video frame. The symbol data according to one embodiment of the present invention corresponds to a symbol image displayed on a screen and may represent a program related to content. More specifically, if the symbol data is included in a video frame, the terminal 2801 may extract the symbol data and generate a request using the logo data and the symbol data. The ACR service system using the symbol data will be described below.

If the receiver cannot access a video signal and thus cannot extract the watermark inserted into a video frame, the terminal 2801 according to the embodiment of the present invention may generate a request using only the watermark extracted from an audio frame. The terminal 2802 may generate the request including the information obtained from the watermark and send the request to the application lookup server 2804. Thereafter, the application lookup server 2804 may search for the URL address and/or IP address of the application accessible by the terminal 2801 using the received request and send the URL address and/or IP address to the receiver. Thereafter, the receiver may receive additional data through the URL address and/or IP address.

Figure 29:
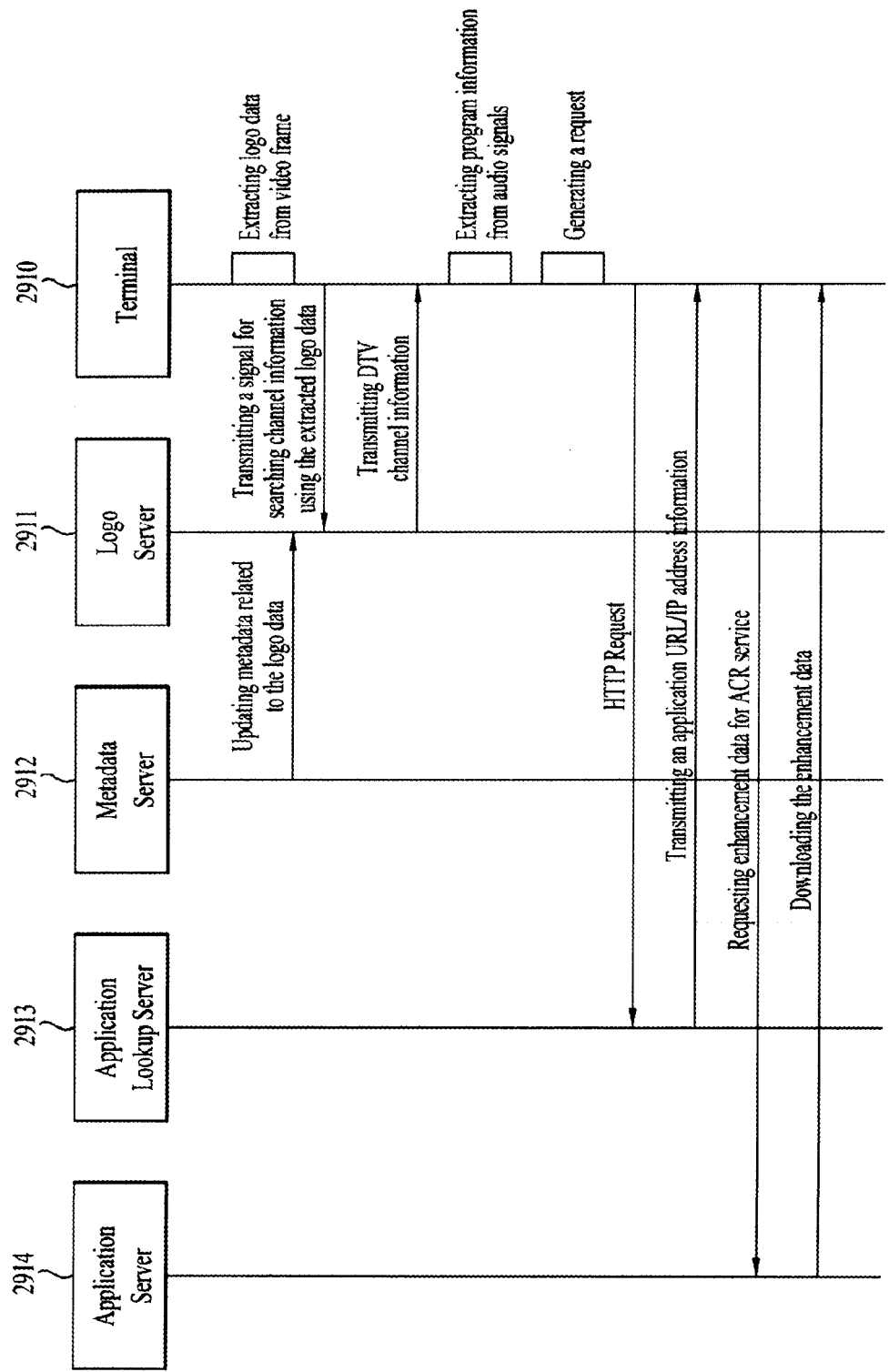
FIG. 29 shows the concept of operation of an ACR service provision apparatus using a logo and/or a watermark according to one embodiment of the present invention.

FIG. 29 shows the concept of operation of an ACR service provision apparatus using a logo and/or a watermark according to one embodiment of the present invention.

FIG. 29 shows the concept of operation of the ACR service provision apparatus for providing an ACR service using the logo and watermark described with reference to FIG. 28, that is, operation between a terminal 2901, a logo server 2902, a metadata server 2903, an application lookup server 2904 and an application server 2905. Hereinafter, operation between the components will be described.

First, the terminal 2901 may extract logo data from a video frame. Thereafter, the terminal 2901 may send logo data and a channel information search signal to the logo server 2902 as described above.

The logo server 2902 may search for channel information according to a request signal of the terminal and transmit the searched channel information to the terminal 2901.

The metadata server 2903 may periodically update metadata related to the logo data and send the updated metadata to the logo server 2902. The metadata server 2903 may update the metadata before receiving the logo data or after receiving the logo data.

In addition, the terminal 2901 may extract a watermark from an audio frame and obtain program information from the watermark. The terminal 2901 according to the embodiment of the present invention may simultaneously or sequentially perform a process of extracting logo data from a video frame and a process of extracting a watermark from an audio frame, which may be changed according to designer's intention.

Thereafter, the terminal 2901 may generate a request using the channel information extracted from the logo data and/or the program information extracted from the watermark. The terminal 2901 may send the request to the application lookup server 2904 through an HTTP protocol.

The application lookup server 2904 may analyze the received request, search for an URL address and/or IP address of an application capable of providing additional data of the channel and/or program, and send the URL address and/or IP address to the terminal 2901.

The terminal 2901 may access the application server 2905 through the received URL address and/or IP address and download the application. The downloaded application may be managed by the application server 2905 and the additional data may be sent to the terminal 2901 through the downloaded application.

Figure 30:
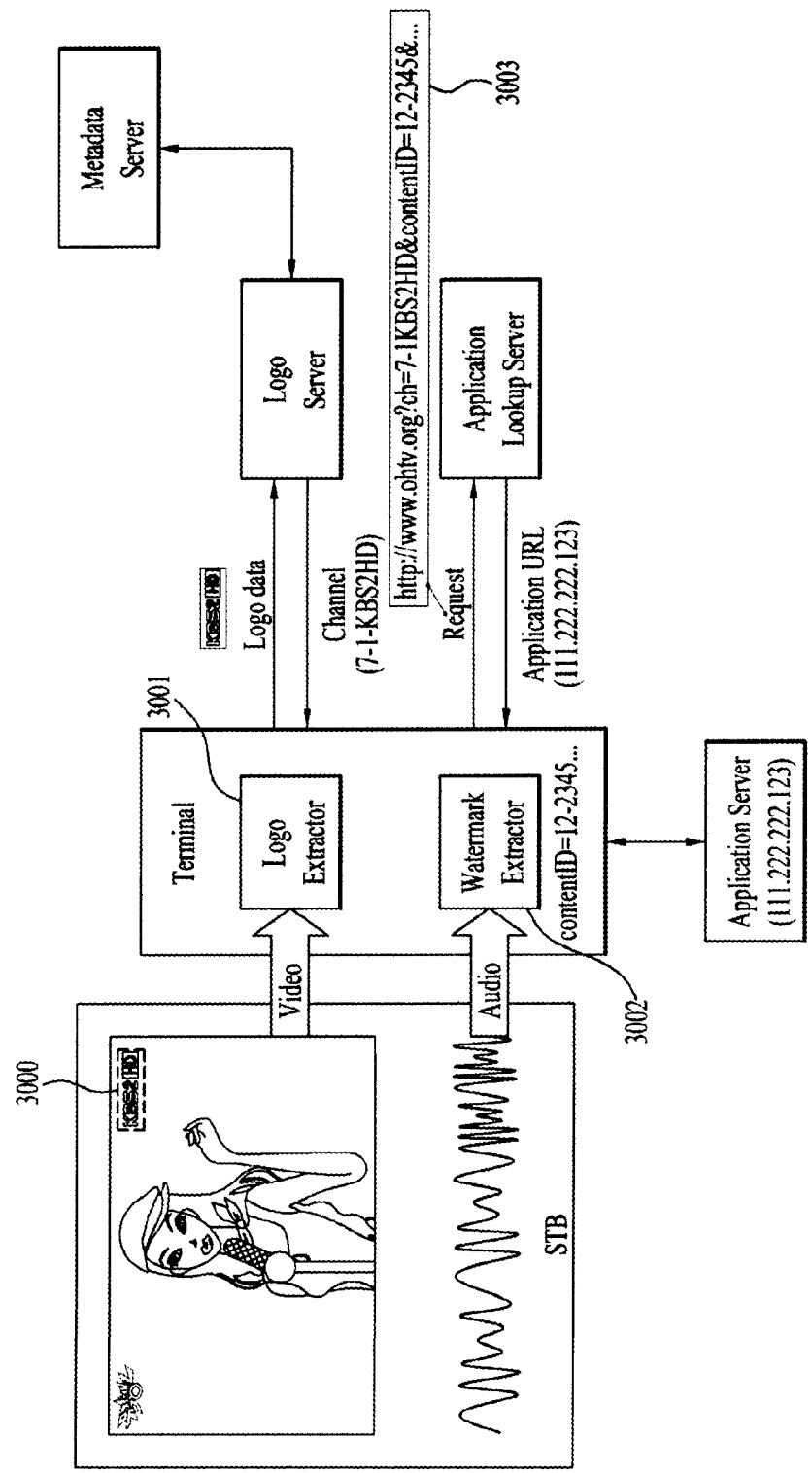
FIG. 30 is a diagram showing an ACR service processing system according to another embodiment of the present invention.

FIG. 30 is a diagram showing an ACR service processing system according to another embodiment of the present invention.

FIG. 30 shows an ACR service processing system according to operation described with reference to FIG. 29, which may include a set top box (STB), a terminal, a logo server, a metadata server, an application lookup server and/or an application server. The terminal may further include a logo extractor 3001 and/or a watermark extractor 3002. As shown in FIG. 30, a logo image 3000 corresponding to logo data included in a video frame may be included in a specific part of displayed content. As described with reference to FIGS. 28 and 29, the terminal may send the request 3003 to the application lookup server. The basic components shown in FIG. 30 are equal to those described with reference to FIG. 28 and a description of operations of the components equal to those described with reference to FIG. 28 will be omitted.

As shown in FIG. 30, the terminal may process a video signal and an audio signal included in a broadcast signal received from the STB via independent paths. Hereinafter, the logo extractor 3001 and/or the watermark extractor 3002 included in the terminal will be focused upon.

The logo extractor 3001 may automatically recognize and extract logo data corresponding to the logo image 3000 from the video frame. More specifically, the logo extractor 3001 may recognize a specific area of the video frame and extract the logo data located in the specific area. The logo extractor 3001 may recognize the logo image 3000 corresponding to the logo data extracted through image processing.

The terminal may send the extracted logo data to the logo server such that the logo server compares the logo data extracted by the logo extractor 3001 with the logo data stored in the DB of the logo server. A detailed comparison method is described with reference to FIG. 28. If the logo image 3000 corresponding to the extracted logo data is equal to the logo image of the stored logo data, the logo server may search for channel information of the logo data and send the channel information to the terminal. According to one embodiment of the present invention, the channel information may be represented in a "channel number (major-minor)"-"short number" format.

The logo server may periodically receive the updated logo data from the metadata server and continuously update the DB of the logo server. If the channel information of the logo data is not currently present in the DB of the logo server, the logo server may receive the channel information from the metadata server.

The watermark extractor 3002 may recognize and extract a watermark inserted into an audio frame. The watermark inserted into the audio frame may include program information including content ID information and/or time information and further include CP ID information, content life cycle information described with reference to FIG. 12, which may be changed according to designer's intention. Accordingly, the watermark extractor 3002 may obtain the program information from the extracted watermark.

The terminal may generate a request using the program information extracted from the watermark of the audio frame and the channel information extracted from the logo data of the video frame and send the request to the application lookup server.

The request 3003 according to one embodiment of the present invention may be composed of a combination of the channel information, the program information and the URL address of the application server. FIG. 30 shows http://www.ohtv.org?ch=7-1-KBS2HD&ContentID= 12-2345& . . . which is the request 3003 according to one embodiment of the present invention.

The request shown in FIG. 30 is a request in which channel information and program information are represented in the form of parameters, http://www.ohtv.org? may indicate the URL address of the application lookup server 2904, "ch=7-1-KBS2HD&" may indicate channel information and "ContentID=12-2345& . . . " may indicate program information.

The application lookup server may search for the URL address and/or IP address of the application capable of obtaining additional data using parameters of the request received from the terminal and send the searched result to the terminal.

Figure 31:
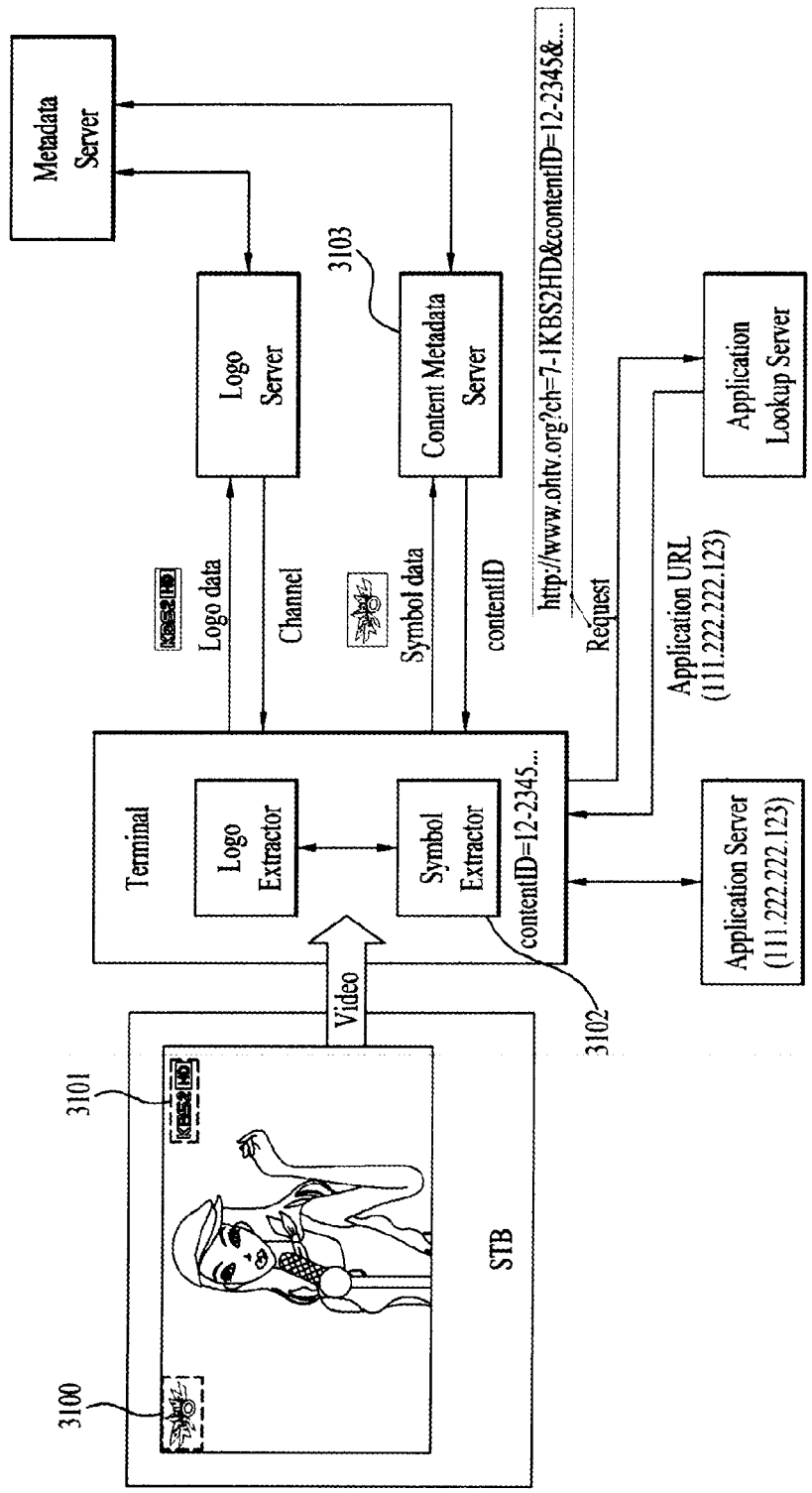
FIG. 31 is a diagram showing an ACR service processing system according to another embodiment of the present invention.

FIG. 31 is a diagram showing an ACR service processing system according to another embodiment of the present invention.

FIG. 31 shows an ACR service processing system for receiving additional data through a request generated using logo data and symbol data. The ACR service processing system shown in FIG. 31 may include a set top box (STB), a terminal, a logo server, a metadata server, an application lookup server and/or an application server, equally to FIG. 30. The ACR service processing system of FIG. 31 may further include a symbol extractor 3102 and/or a content metadata server 3103.

The basic components shown in FIG. 31 are equal to those described with reference to FIG. 28 and FIG. 30 and a description thereof will be omitted. Hereinafter, the symbol extractor 3102 and/or the content metadata server 3103 will be focused upon.

As shown in FIG. 31, the symbol extractor 3102 may be incorporated in the terminal. The content metadata server 3013 may be incorporated in the terminal or located separately from the terminal, which may be changed according to designer's intention. As shown in FIG. 31, a symbol image 3100 and/or a logo image 3101 may be included in a specific area of displayed content.

As described with reference to FIG. 28, if the receiver according to the embodiment of the present invention cannot access an audio signal, the terminal may obtain symbol data included in a video frame and generate a request using the logo data and the symbol data.

More specifically, the symbol extractor 3108 of the terminal shown in FIG. 31 may extract symbol data corresponding to the symbol image 3100 from the video frame and recognize a symbol image 3100 corresponding to the extracted symbol data using an image processing method. Thereafter, the terminal may send the recognized symbol image 3100 or the symbol data corresponding to the symbol image 3100 to the content metadata server 3103.

The content metadata server 3103 may obtain and send program information of a program indicated by the symbol image 3100 to the terminal. The content metadata server 3103 may receive metadata including program information related to the symbol image 3100 from the metadata server and store and manage the metadata in a DB. The content metadata server 3103 may search the DB of the content metadata server 3103 to obtain program information and receive program information from the metadata server if the program information is not present in the DB. As described above, the program information according to the embodiment of the present invention may include content ID information and/or time information. The metadata including the program information may be added, corrected, updated and/or deleted by the metadata server. The updated metadata may be periodically sent to the DB of the content metadata server 3103.

As shown in FIG. 31, the terminal may extract logo data from the video frame. As described with reference to FIG. 30, the logo extractor included in the terminal may extract logo data corresponding to the logo image 3103 from the video frame, send the logo data to the logo server and receive channel information of the logo data from the logo server.

Operations of the above-described logo extractor and the symbol extractor 3102 may be sequentially or simultaneously performed and may be changed according to designer's intention. The terminal may generate a request including the program information obtained using the symbol data and/or the channel information obtained using the logo data. The method of receiving additional data at the terminal using the generated request is equal to the method described with reference to FIG. 29 and a description thereof will be omitted.

Figure 32:
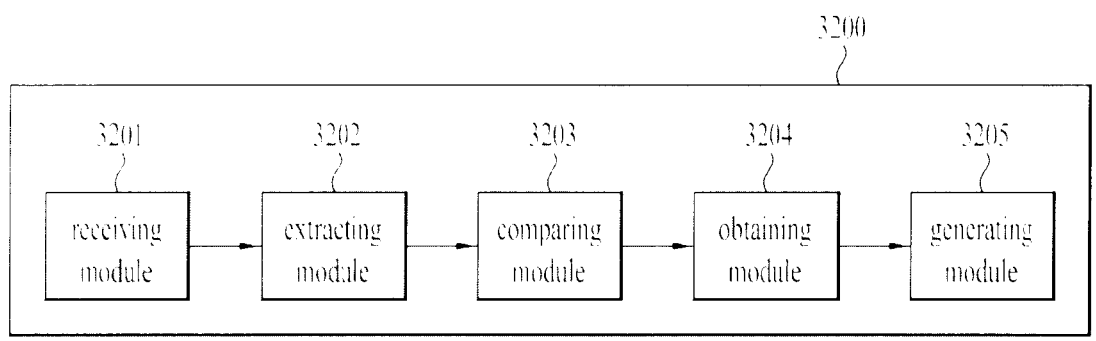
FIG. 32 is a diagram showing an ACR service reception apparatus according to an embodiment of the present invention.

FIG. 32 is a diagram showing an ACR service reception apparatus according to an embodiment of the present invention.

As shown in FIG. 32, the ACR service reception apparatus according to the embodiment of the present invention may include a receiving module 3201, an extracting module 3202, a comparing module 3203, an obtaining module 3204 and/or a generating module 3205.

The receiving module 3201, the extracting module 3202, the obtaining module 3204 and/or the generating module 3205 shown in FIG. 32 may be incorporated in the terminal 2801 described with reference to FIGS. 28 to 31 and the comparing module 3203 shown in FIG. 32 may be incorporated in the logo server 2802 described with reference to FIGS. 28 to 31, which may be changed according to designers' intention. Hereinafter, the modules of FIG. 32 will be described.

The receiving module 3201 may receive a digital service signal including content. In addition, the receiving module 3201 may receive an URL address and/or an IP address for receiving additional data of content. the detailed process of receiving the URL address and/or the IP address was described with reference to FIGS. 28 to 31.

The extracting module 3202 may extract logo data included in each video frame of the received content. The logo data may be included in a specific area of a video frame and corresponds to a logo image displayed in a specific area of content as described with reference to FIGS. 28 to 31. The extracting module 3020 may extract a watermark from a specific area of a video frame. In the embodiment of the present invention, the watermark extracted from the video frame may include channel information and/or program information.

The comparing module 3203 may compare the logo data extracted by the extracting module 3202 with the logo data stored in the ACR service reception apparatus 3200. The detailed method of comparing the extracted logo data with the stored logo data was described with reference to FIGS. 28 to 31.

The obtaining module 3204 may obtain channel information from the metadata related to the logo data using the comparison result of the comparing module 3203. The obtaining module 3204 may obtain additional data of the content using the URL address and/or IP address received by the receiving module 3201.

The generating module 3205 may generate a request using the channel information obtained by the obtaining module 3024. As described with reference to FIGS. 28 to 31, the generating module 3205 may generate a request using the obtained channel information of the logo data and/or the program information of the watermark included in an audio frame. If an audio frame is not accessible, the generating module 3205 may generate a request using only the obtained channel information of the logo data or the symbol data included in the video frame. If a video frame is not accessible, the generating module 3205 may generate a request using only the program information of the watermark included in the audio frame.

The receiving module 3201 may receive an URL address and/or an IP address using the request generated by the generating module 3205. The obtaining module 3204 may obtain additional data over an IP network according to the URL address and/or IP address received by the receiving module 3201.

Although not shown in FIG. 32, the ACR service reception apparatus 3200 according to the embodiment of the present invention may further include a watermark extracting module, a program information obtaining module, a symbol extracting module, a processing module and/or an updating module. The watermark extracting module, the program information obtaining module and/or the symbol extracting module may be included in the terminal 2801 described with reference to FIGS. 28 to 31. The processing module may be included in the terminal 2801 or the content metadata server 3103 described with reference to FIGS. 28 to 31. The updating module may be included in the terminal 2801 or the metadata server 2803 described with reference to FIGS. 28 to 31. This may be changed according to designer's intention.

The watermark extracting module according to the embodiment of the present invention may extract a watermark from an audio frame of content received by the receiving module 3201. Thereafter, the program information obtaining module may obtain program information included in the extracted watermark. As described with reference to FIG. 28, the program information according to the embodiment of the present invention may include content ID information and/or time information. The detailed method of extracting the watermark from the audio frame at the terminal was described with reference to FIG. 30.

If symbol data is included in a video frame, the symbol extracting module according to the embodiment of the present invention may extract the symbol data from the video frame. Thereafter, the program information obtaining module according to the embodiment of the present invention may obtain program information from the extracted watermark. The symbol data may be included in a specific area of each video frame. Detailed operations of the symbol extracting module and/or the program information obtaining module were described with reference to FIG. 31.

The updating module according to the embodiment of the present invention may periodically update metadata related to logo data. As described with reference to FIGS. 28 to 31, the metadata server 2803 may continuously add, update and/or delete the logo data stored in the metadata lookup server 2804.

Figure 33:
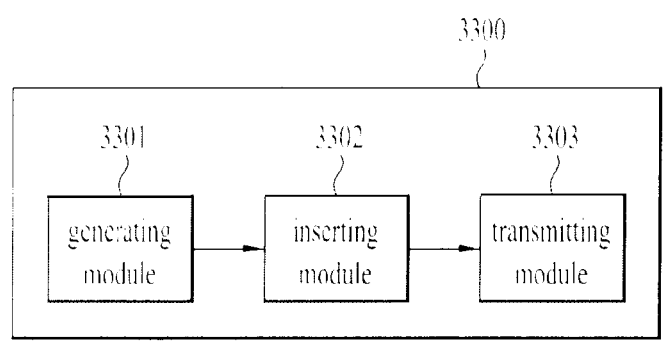
FIG. 33 is a diagram showing an ACR service transmission apparatus according to an embodiment of the present invention.

FIG. 33 is a diagram showing an ACR service transmission apparatus according to an embodiment of the present invention.

As shown in FIG. 33, the ACR service transmission apparatus according to the embodiment of the present invention may include a generating module 3301, an inserting module 3302 and/or a transmitting module 3303.

The generating module 3301 may generate a digital service signal including content. More specifically, the content generated according to the embodiment of the present invention may include both video content and audio content. The generating module 3301 may generate a watermark to be inserted into an audio and/or video frame. The generating module 4401 may generate symbol data indicating a program of the content.

The inserting module 3302 may insert logo data into each video frame of the content. More specifically, the logo data may be inserted into the same specific area of each video frame and corresponds to a logo image displayed in the specific area of the content.

In addition, the inserting module 3302 may insert a watermark into an audio and/or video frame. More specifically, the inserting module 3302 may divide the audio and/or video frame into subframes and detect a specific subframe, into which the watermark will be inserted, from the divided subframes. Thereafter, the inserting module 3302 may insert the watermark into the specific subframe and combine the subframes to generate an audio and/or video frame.

The inserting module 3302 may insert the symbol data generated by the generating module 3301 into a specific area of each video frame of the content.

The transmitting module 3303 may transmit a digital service signal including content, into which the logo data and/or the watermark are inserted through the inserting module 3302, to the ACR service reception apparatus 3200 described with reference to FIG. 32. The logo data according to the embodiment of the present invention may be used to receive the channel information by the obtaining module 3204 described with reference to FIG. 32. The channel information according to the embodiment of the present invention may be used to receive the URL address and/or the IP address by the receiving module 3201 described with reference to FIG. 32.

Figure 34:
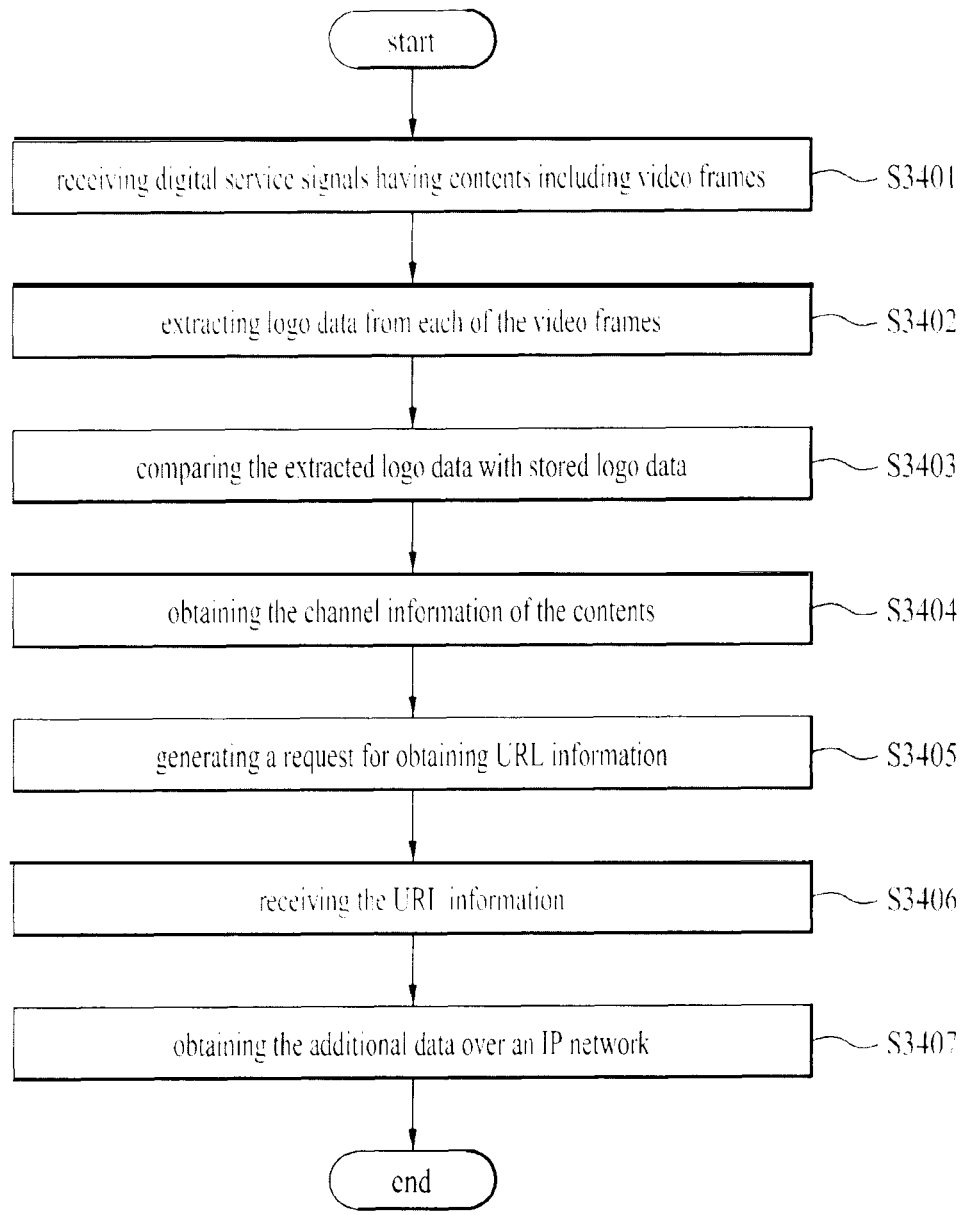
FIG. 34 is a diagram showing an ACR service reception process according to an embodiment of the present invention.

FIG. 34 is a diagram showing an ACR service reception process according to an embodiment of the present invention.

The receiving module 3201 according to one embodiment of the present invention may receive the digital service signal including the content (S3401). As described above, the receiving module 3201 may be incorporated in the terminal 2801 described with reference to FIGS. 28 to 32. More specifically, as described with reference to FIG. 28, the terminal 2801 may recognize the logo data from the video frame of the raw data of the broadcast content received via the STB 2800.

The extracting module 3202 according to one embodiment of the present invention may extract the logo data from a specific area of each video frame of the received content (S3402). As described above, the extracting module 3202 may be incorporated in the terminal 2801 described with reference to FIGS. 28 to 32.

More specifically, as described with reference to FIG. 30, the logo extractor 3001 of the terminal may extract the logo data from the video frame through image processing. The logo data may be included in a specific area of the video frame and correspond to the logo image displayed in the specific area of the content as described with reference to FIGS. 28 to 31.

The terminal 2801 according to the embodiment of the present invention may extract the watermark from the audio frame and obtain the program information using the extracted watermark. The extracted watermark may include the program information. As described with reference to FIG. 28, the program information according to the embodiment of the present invention may include content ID information and/or time information. The detailed method of extracting the watermark from the audio frame at the terminal was described with reference to FIG. 30.

The terminal 2801 according to the embodiment of the present invention may extract the symbol data from the specific area of each video frame. Thereafter, the terminal 2801 may process the extracted symbol data to obtain the program information. The symbol data may include the program information, which was described in detail with reference to FIG. 31.

As described with reference to FIGS. 28 to 31, the terminal 2801 according to the embodiment of the present invention may extract the watermark from the specific area of each video frame. In the embodiment of the present invention, the watermark extracted from the video frame includes the channel information and/or the program information.

The comparing module 3203 according to one embodiment of the present invention may compare the extracted logo data with the logo data stored in the DB of the logo server 2802 (S3403). As described above, the comparing module 3203 may be incorporated in the terminal described with reference to FIGS. 28 to 32. The detailed method of comparing the extracted logo data with the stored logo data was described with reference to FIGS. 28 to 31.

The obtaining module 3204 according to one embodiment of the present invention may obtain the channel information from the metadata related to the logo data (S3404). As described above, the obtaining module 3201 may be incorporated in the terminal 2801 described with reference to FIGS. 28 to 31.

More specifically, as described with reference to FIGS. 28 to 30, if the images of the extracted logo data and the stored logo data are equal, the logo server may search the DB for the channel information of the logo data and send the channel information to the terminal.

In addition, the updating module according to the embodiment of the present invention may periodically update the metadata related to the logo data. As described with respect to the FIG. 32, the updating module may be incorporated in the terminal or the metadata server. The metadata server according to the embodiment of the present invention may periodically update the metadata stored in the DB of the logo server.

The generating module 2305 according to one embodiment of the present invention may generate a request using the channel information (S3405). As described above, the generating module 3205 may be incorporated in the terminal 2801 described with reference to FIGS. 28 to 32.

More specifically, as described with respect to FIG. 30, the terminal may generate the request using the channel information received from the logo server. As described with reference to FIG. 29, the terminal may send the generated request to the application lookup server 2904 through an HTTP protocol.

As described with reference to FIGS. 28 to 31, the generating module 3205 may generate the request using the obtained channel information of the logo data and the program information of the watermark included in the audio frame. In addition, if the audio frame is not accessible, the generating module 3205 may generate the request using only the obtained channel information of the logo data or using the symbol data included in the video frame. If the video frame is not accessible, the generating module 3205 may generate the request using only the program information of the watermark included in the audio frame.

The receiving module 3201 according to one embodiment of the present invention may receive the URL address and/or IP address using the request (S3406). As described above, the receiving module 3201 may be incorporated in the terminal 2801 described with reference to FIGS. 28 to 32.

More specifically, as described with reference to FIG. 29, the terminal 2901 may receive the URL address and/or IP address of the application searched using the request by the application lookup server 2904. The detailed process of the URL address and/or IP address was described with reference to FIGS. 28 to 31.

The obtaining module 3204 according to one embodiment of the present invention may obtain the additional data over the IP network according to the URL address and/or IP address (S3407). As described above, the obtaining module 3204 may be incorporated in the terminal 2801 described with reference to FIGS. 28 to 32.

More specifically, as described with reference to FIG. 29, the terminal 2901 may access the application 2905 through the URL address and/or IP address to download the application. The downloaded application may be managed by the application server 2905 and the additional data may be sent to the terminal 2901 through the downloaded application, which was described in detail with reference to FIGS. 28 to 31.

Figure 35:
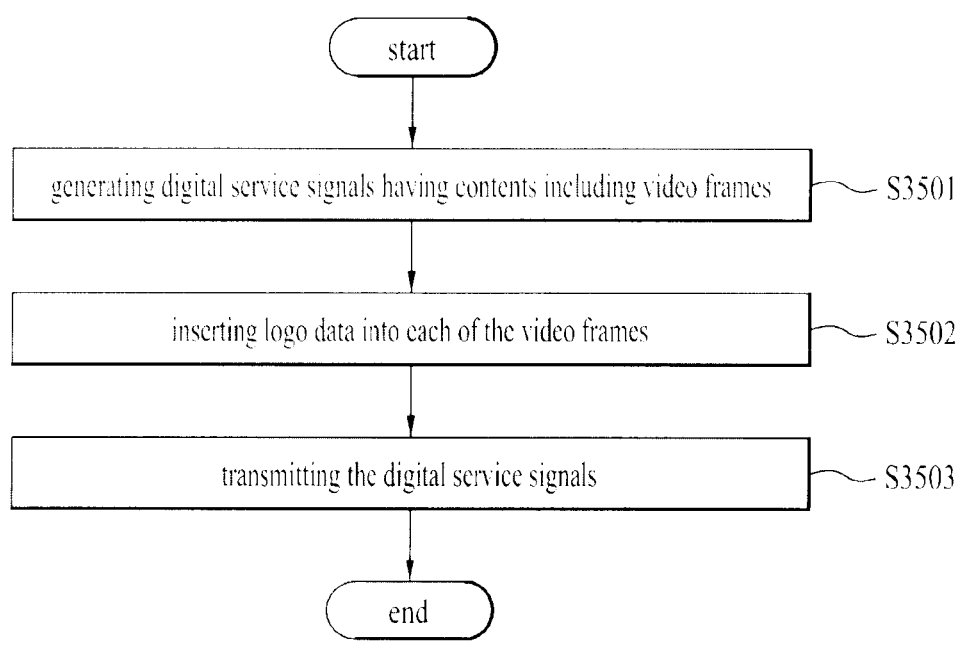
FIG. 35 is a diagram showing an ACR service transmission process according to an embodiment of the present invention.

FIG. 35 is a diagram showing an ACR service transmission process according to an embodiment of the present invention.

The generating module 3301 according to the embodiment of the present invention may generate the digital service signal including the content (S3501). More specifically, the content generated according to the embodiment of the present invention may include both video content and audio content.

The generating module 3301 may generate the watermark which will be inserted into the audio and/or video frame. In addition, the generating module 3301 may generate the symbol data indicating the program of the content.

The inserting module 3302 according to the embodiment of the present invention may insert the logo data into each video frame of the content (S3502). More specifically, the logo data may be inserted into the same specific area of each video frame and correspond to the logo image displayed in the specific area of the content.

The inserting module 3302 may insert the watermark into the audio and/or video frame. More specifically, the inserting module 3302 may divide the audio and/or video frame into subframes and detect a specific subframe, into which the watermark will be inserted, from the divided subframes. Thereafter, the inserting module 3302 may insert the watermark to the specific subframe and combine the subframes to generate the audio and/or video frame.

In addition, the inserting module 3302 may insert the symbol data into the specific area of each video frame of the content, which is described in detail with reference to FIG. 31.

The transmitting module 3303 according to the embodiment of the present invention may transmit the digital service signal (S3503). The transmitting module 3303 may transmit the digital service signal including the content, into which the watermark and/or the logo data are inserted through the inserting module 3302, to the ACR service reception apparatus 3200 described with reference to FIG. 32. The logo data according to the embodiment of the present invention may be used to receive the channel information by the obtaining module 3204 described with reference to FIG. 32. The channel information according to the embodiment of the present invention may be used to receive the URL address and/or IP address by the receiving module 3201 described with reference to FIG. 32.

According to the present invention, it is possible to identify information regarding a broadcast program in real time using ACR technology.

According to the present invention, it is possible to receive enhancement data related to a broadcast program using an ACR function so as to have an improved TV viewing experience.

According to the present invention, by recognizing information regarding a broadcast program and receiving enhancement data using watermarking technology, a TV receiver can perform an ACR function alone without a separate ACR server.

According to the present invention, it is possible to profile a watermark according to information included in the watermark and efficiently utilize watermarking even when the amount of information included in the watermark is large.

According to the present invention, by combining watermarking and fingerprinting, it is possible to efficiently provide an ACR service.

As described above, the present invention can be wholly or partially applied to apparatus for dual display.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A method of providing an interactive service related to a content, the method comprising:
    receiving by a receiving processor the content including logo image, symbol image and watermarks, wherein the logo image indicates a content provider, wherein the symbol image indicates the content related to the content provider indicated by the logo image,
    wherein the watermarks carry additional information related to the content indicated by the symbol image, wherein the logo image and symbol image are included in video frames of the content and the watermarks are inserted in audio or video frames of the content,
    wherein a start tag indicating the start of the additional information is inserted in the first part of the additional information,
    wherein an end tag indicating the end of the additional information is inserted in the last part of the additional information,
    wherein the additional information including the start tag and end tag is divided into two or more sub additional information,
    wherein each of the watermarks includes one of the sub additional information,
    wherein the each of the watermarks is inserted in the successive audio or video frames in order;
    extracting by a first extracting processor the logo image and the symbol image in the video frames:
    comparing by a first comparing processor color, text and outline of the logo image with color, text and outline of logo images stored in a logo server, wherein the logo image is located in a specific fixed area in each of the video frames;
    comparing by a second comparing processor color, text and outline of the symbol image with color, text and outline of symbol images stored in a symbol server, wherein the symbol image is located in a specific fixed area in each of the video frames;
    extracting by a second extracting processor the watermarks from the successive audio or video frames of the content;
    obtaining by a first obtaining processor a content provider identifier identifying a provider of the content from the logo server;
    obtaining by a second obtaining processor a content identifier identifying the content from the symbol server;
    obtaining by a third obtaining processor the sub additional information from the watermarks in the successive audio or video frames;
    combining by a combining processor the sub additional information to generate the additional information by using the start tag and the end tag;
    generating by a generating processor a request for obtaining URL information for the interactive service related to the content by using the content provider identifier, the content identifier and the additional information;
    receiving by the receiving processor the URL information by using the request; and
    obtaining by one of the first, second and third obtaining processor the interactive service over an IP (Internet Protocol) network according to the URL information;
    displaying by a displaying processor the interactive service.

2. The method of claim 1, wherein the method further includes:
    updating by an updating processor the content provider identifier related to the logo image periodically.

3. The method of claim 1,
    wherein a watermark in one of the frames includes a first-level watermark and a second-level watermark as an extension of the first-level watermark,
    wherein the first-level watermark includes a timestamp and a first extension indicator, wherein the timestamp includes timing information for the content, wherein the first extension indicator indicates whether the first-level watermark has extension,
    wherein the second-level watermark includes the URL information for the interactive service related to the content.

4. The method of claim 3,
    wherein the watermarks are inserted into the audio or video frames with different periods depending on how many extensions the watermarks have.

5. An apparatus for providing an interactive service related to a content, comprising:
    a receiving processor that receives the content including logo image, symbol image and watermarks, wherein the logo image indicates a content provider, wherein the symbol image indicates the content related to the content provider indicated by the logo image, wherein the watermarks carry additional information related to the content indicated by the symbol image, wherein the logo image and symbol image are included in video frames of the content and the watermarks are inserted in audio or video frames of the content,
    wherein a start tag indicating the start of the additional information is inserted in the first part of the additional information, wherein an end tag indicating the end of the additional information is inserted in the last part of the additional information, wherein the additional information including the start tag and end tag is divided into two or more sub additional information, wherein each of the watermarks includes one of the sub additional information, wherein the each of the watermarks is inserted in the successive audio or video frames in order;

a first extracting processor that extracts the logo image and the symbol image in the video frames;

a first comparing processor that compares color, text and outline of the logo image with color, text and outline of logo images stored in a logo server, wherein the logo image is located in a specific fixed area in each of the video frames;

a second comparing processor that compares color, text and outline of the symbol image with color, text and outline of symbol images stored in a symbol server, wherein the symbol image is located in a specific fixed area in each of the video frames;

a second extracting processor that extracts the watermarks from the successive audio or video frames of the content;

a first obtaining module processor that obtains a content provider identifier identifying a provider of the content from the logo server;

a second obtaining processor that obtains a content identifier identifying the content from the symbol server;

a third obtaining processor that obtains the sub additional information from the watermarks in the successive audio or video frames;

a combining processor that combines the sub additional information to generate the additional information by using the start tag and the end tag;

a generating processor that generate a request for obtaining the URL information for the interactive service related to the content by using the content provider identifier, the content identifier and the additional information, wherein the receiving processor receives the URL information by using the request, wherein one of the first, second and third obtaining processor obtains the interactive service over an IP(Internet Protocol network) according to the URL information;

a display processor that displays the interactive service.

6. The apparatus of claim 5, the apparatus further comprises an updating processor that updates the content provider identifier related to the logo image periodically.

7. The apparatus of claim 5, wherein a watermark in one of the frames includes a first-level watermark and a second-level watermark as an extension of the first-level watermark, wherein the first-level watermark includes a timestamp and a first extension indicator, wherein the timestamp includes timing information for the content, wherein the first extension indicator indicates whether the first-level watermark has extension, wherein the second-level watermark includes the URL information for the interactive service related to the content.

8. The method of claim 7, wherein the watermarks are inserted into the audio or video frames with different periods depending on how many extensions the watermarks have.

* * * * *